United States Patent
Kim et al.

(10) Patent No.: US 9,651,989 B2
(45) Date of Patent: May 16, 2017

(54) MOBILE TERMINAL

(71) Applicant: LG ELECTRONICS INC., Seoul (KR)

(72) Inventors: Jihwan Kim, Seoul (KR); Sinae Chun, Seoul (KR); Yongsin Kim, Seoul (KR); Doyoung Lee, Seoul (KR); Jongho Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 10 days.

(21) Appl. No.: 14/474,671

(22) Filed: Sep. 2, 2014

(65) Prior Publication Data

US 2015/0261376 A1   Sep. 17, 2015

(30) Foreign Application Priority Data

Mar. 14, 2014   (KR) .................. 10-2014-0030474

(51) Int. Cl.
| | |
|---|---|
| *G06F 3/041* | (2006.01) |
| *G06F 1/16* | (2006.01) |
| *G06F 3/0487* | (2013.01) |
| *G06F 3/0488* | (2013.01) |

(52) U.S. Cl.
CPC .......... *G06F 1/1626* (2013.01); *G06F 1/1652* (2013.01); *G06F 3/0487* (2013.01); *G06F 3/04883* (2013.01); *G06F 3/04886* (2013.01); *G06F 2203/04809* (2013.01)

(58) Field of Classification Search
CPC ........ G06F 1/1626; G06F 9/4406; G06F 3/03; G06F 3/0412; G06F 3/0416; G06F 3/0487; G06F 3/0486; G06F 2203/04102; G06F 1/1652; G06F 3/04883; G06F 3/04886; G06F 2203/04809; G06Q 20/1085

See application file for complete search history.

(56) References Cited

U.S. PATENT DOCUMENTS 6,073,120 A * 6/2000 Shiota ................ G06Q 20/1085
235/379
8,543,166 B2   9/2013 Choi et al.
(Continued)

FOREIGN PATENT DOCUMENTS

JP   2009009424 A * 1/2009
KR   10-2010-0027501 A   3/2010

*Primary Examiner* — Kent Chang
*Assistant Examiner* — Mark Edwards
(74) *Attorney, Agent, or Firm* — Birch, Stewart, Kolasch & Birch, LLP

(57) ABSTRACT

Provided is a mobile terminal. The mobile terminal including: a body including a front surface, a side surface and a rear surface, a touch screen including a first region that is disposed on the front surface and formed to have a first curvature and a second region that is disposed on the side surface and extending from the first region and formed to have a second curvature, a sensing unit configured to sense a touch input applied to the touch screen; and a control unit configured to: display on the first region of the touch screen at least a portion of an execution screen of an application, detect a touch input applied to the execution screen, and display on an interface region located between the first region and the second region at least a portion of a graphic object associated with control of an execution screen.

17 Claims, 19 Drawing Sheets

(56) References Cited

U.S. PATENT DOCUMENTS

| | | | |
|---|---|---|---|
| 2007/0128899 A1* | 6/2007 | Mayer | G06F 9/4406 439/152 |
| 2008/0211779 A1* | 9/2008 | Pryor | G01C 21/3664 345/173 |
| 2012/0329528 A1 | 12/2012 | Song | |
| 2013/0076612 A1* | 3/2013 | Myers | G06F 1/1626 345/156 |
| 2013/0100053 A1* | 4/2013 | Kang | G06F 3/03 345/173 |
| 2013/0300697 A1* | 11/2013 | Kim | G06F 1/1626 345/173 |
| 2014/0062976 A1* | 3/2014 | Park | G09G 5/00 345/204 |

* cited by examiner (a)

(b)

(a)

(b)

(a)

(b)

(b)

(b)

(a)

(b)

MOBILE TERMINAL

CROSS-REFERENCE

Pursuant to 35 U.S.C. §119(a), this application claims the benefit of earlier filing date and right of priority to Korean Application No. 10-2014-0030474, filed on Mar. 14, 2014 the contents of which is incorporated by reference herein in its entirety.

TECHNICAL FIELD

The present invention relates to a mobile terminal, and more particularly, to a mobile terminal including a side display.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components. For instance, a user interface for allowing a user to easily and conveniently search for or select a function is being provided.

In recent years, as mobile terminals are regarded as one of personal belongings for expressing user's individuality, more diversely designed shapes are required. In the requirements of such designed shapes, structures thereof are also modified and improved so that the user uses the mobile terminal more comfortably. Therefore, as one example of such structural modifications and improvements, a mobile terminal including a side display may be considered.

In this way, when the mobile terminal includes the side display area, visual information that has been output to a front display area may be output to extend to the side display area. In addition, a user interface for controlling the visual information may be considered to use the front and side display areas.

DISCLOSURE OF THE INVENTION

Therefore, an object of the present invention is to provide a mobile terminal that can easily stably control a screen output to a display unit using front and side displays.

Another aspect of the detailed description is to provide a mobile terminal that can comfortably instinctively apply an input while minimizing hiding of a screen that has been output to front and side displays.

To achieve these and other advantages and in accordance with the purpose of the present invention, as embodied and broadly described herein, there is provided a mobile terminal including: a body including a front surface, a side surface and a rear surface; a display unit including a front display area that is disposed on the front surface and formed to have a first curvature and a side display that extends from the front display area, is disposed on the side surface and is formed to have a second curvature; a sensing unit configured to sense a touch input applied to the display unit; and a control unit configured to perform control such that at least a part of a graphic object associated with control of an execution screen of an application is output to an interface region located between the front display area and the side display area when at least a part of the execution screen is output to the front display area and a touch input with respect to the execution screen is sensed.

The control unit may differently change an execution screen output to the display unit in response to the fact that dragging input applied to the graphic object is moved from one position in the graphic object to another position.

The graphic object may include information indicating a position of an execution screen output to the display unit. The control unit may control an output range of the execution screen depending on the extent of dragging input applied to the graphic object and display additional information corresponding to the dragging input applied to be adjacent to the graphic object.

The sensing unit may be formed to further sense an inclination of the display unit. The control unit may output a graphic object formed to enable the dragging to be input in a horizontal direction to the interface region in response to the fact that the display unit is inclined to be a horizontal viewing mode and outputs a graphic object formed to enable the dragging to be input in a vertical direction to the interface region in response to the fact that the display unit is inclined to be a vertical viewing mode.

The front display area having the first curvature may be a plane area, and the side display area having the second curvature may be a curved area.

The sensing unit may be configured such that the dragging input applied to the graphic object is also able to be sensed with respect to an edge area of the front display area adjacent to the interface region and an edge area of the side display area adjacent to the interface region.

When the interface region is partitioned into a plurality of areas having different curvatures, the control unit may perform control such that the graphic object is output to a position or area in which the first or second curvature is first changed.

When the interface region is partitioned into a plurality of areas having different curvatures, the control unit may perform control such that the graphic object is output to a boundary position or area having the greatest curvature or change extent in the curvature.

When at least a part of the graphic object is output to the interface region while icons of a plurality of applications are output to the side display area, the control unit may differently change a method of a touch input for executing functions corresponding to the icons of the plurality of applications.

The control unit may perform control such that visual information corresponding to moving of the dragging input applied to the graphic object is output to the side display area.

The visual information may be output to a position opposite to a moving direction of the drag input in the side display. When a touch input is applied to the output visual information, the control unit may perform control such that a screen corresponding to visual information to which the touch input is applied is output to the front display area.

The display unit may be a flexible display unit that is bendable so that at least one of the first and second curvatures is changed by an external force. The control unit may perform control such that the graphic object is moved to a boundary position or area having the greatest change extent in the curvature due to the external force in response to bending of the flexible display unit due to the external force.

When the dragging input applied to the graphic object leaves the graphic object by a criterion range or more and is moved to one position of the front display area or the side display area, the control unit may perform control such that a predetermined alarm is output.

The graphic object may include a first object sensing a drag input and a second portion different from the first portion. The control unit may output the first portion to the interface region and outputs the second portion to an edge area of a front display area adjacent to the interface region or an edge area of a side display adjacent to the interface region.

When a touch input is sensed with respect to one area of the execution screen while at least a part of the execution screen is output to extend to the interface region and the side display area in addition to the front display area, the control unit may perform control such that a part of an execution screen that has been output to the interface region and the side display area is output only to the front display area.

When at least a part of the execution screen is output to extend to the interface region and the side display area in addition to the front display area, the control unit may change a shape of a graphic object output to the interface region depending on an attribute in a background screen of the execution screen.

When first and second objects associated with control of the execution screen are output at the same time, the control unit may output at least a part of the first graphic object to the interface region and the second graphic object to any one of the front display area and the side display area.

To achieve these and other advantages and in accordance with the purpose of this specification, as embodied and broadly described herein, there is also provided a mobile terminal including: a body including a front surface, a side surface and a rear surface; a display unit including a front display area that is disposed on the front surface and formed to have a first curvature and a side display that extends from the front display area is disposed on the side surface and is formed to have a second curvature; a sensing unit configured to sense a touch input applied to the display unit; and a control unit configured to differently change an execution screen depending on the extent to which a touch input applied to an interface region located between the front display area and the side display area is dragged while at least a part of the execution screen of an application is output to the front display area.

The control unit may perform control such that at least a part of the execution screen is output to extend to the interface region and the side display area in addition to the front display area. The control unit may perform control such that a state in which at least a part of the execution screen is output to the interface region and the side display area while the touch input is dragged Is maintained.

The control unit may perform control such that a first mark corresponding to an input of the touch input and a second mark corresponding to release of the touch input are output to the front display area or the side display area.

MODES FOR CARRYING OUT THE PREFERRED EMBODIMENTS

Figure 1A:
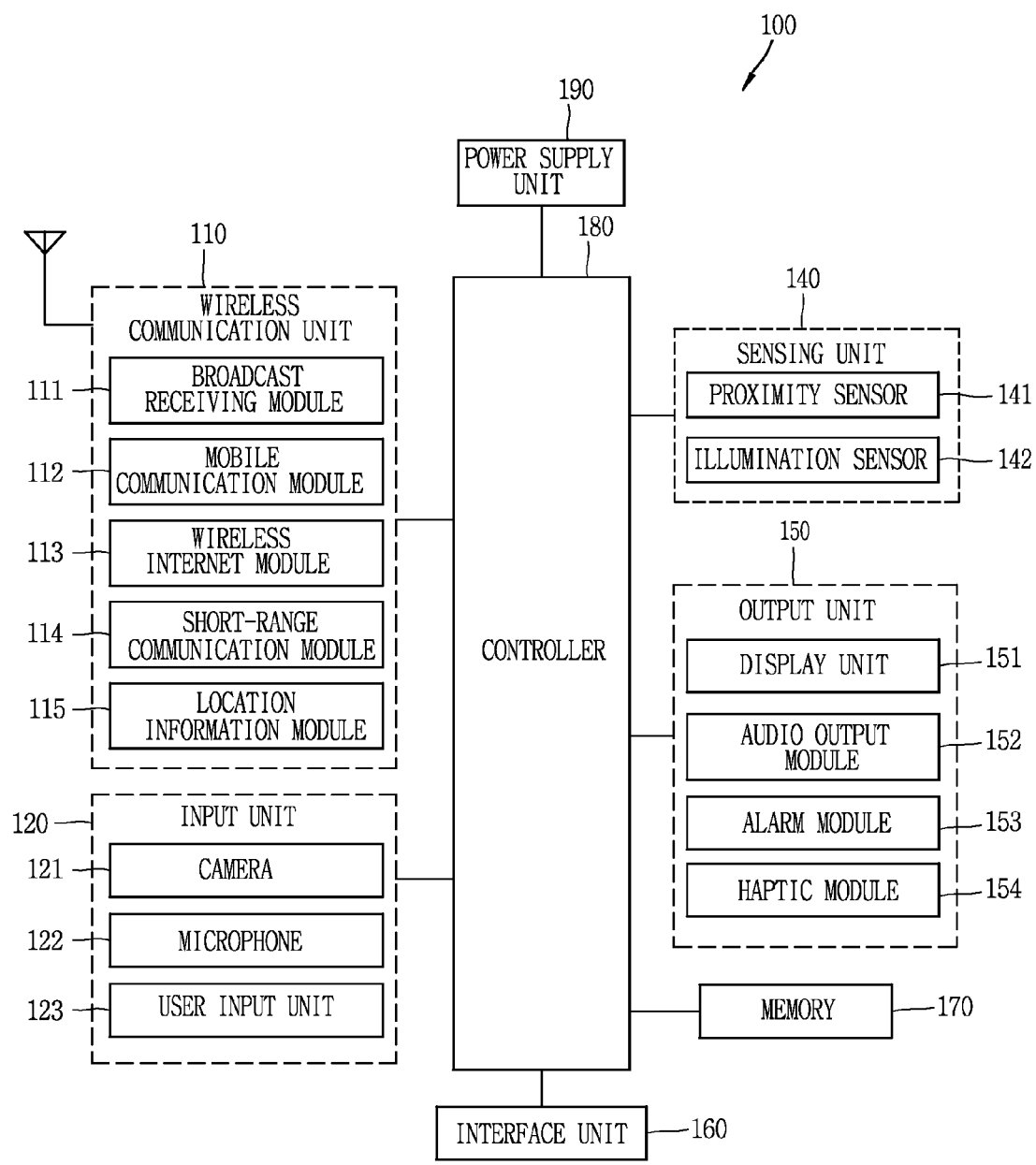
FIG. 1A is a block configuration view of a mobile terminal related to an embodiment of the present invention.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of the exemplary embodiments, with reference to the accompanying drawings. For the sake of brief description with reference to the drawings, the same or equivalent components will be provided with the same reference numbers, and description thereof will not be repeated. A suffix "module" or "unit"

used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc.

However, it will be obvious to those skilled in the art that the present invention may be also applicable to a fixed terminal such as a digital TV, a desktop computer and a digital signage, except for specific configurations for mobility.

Figure 1B:
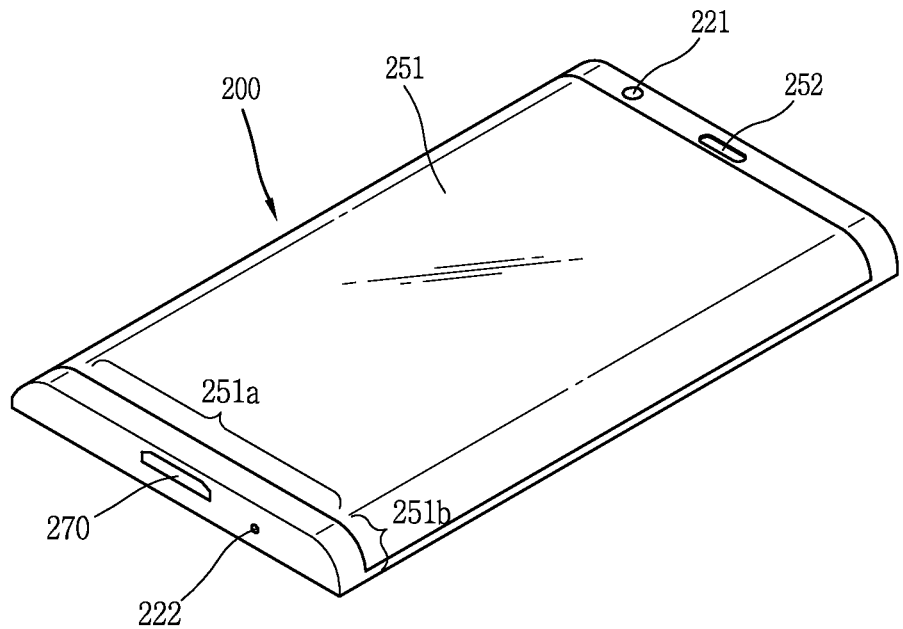
FIGS. 1B and 1C are perspective views of an exemplary mobile terminal related to the present invention when viewed in different directions.
Figure 1C:
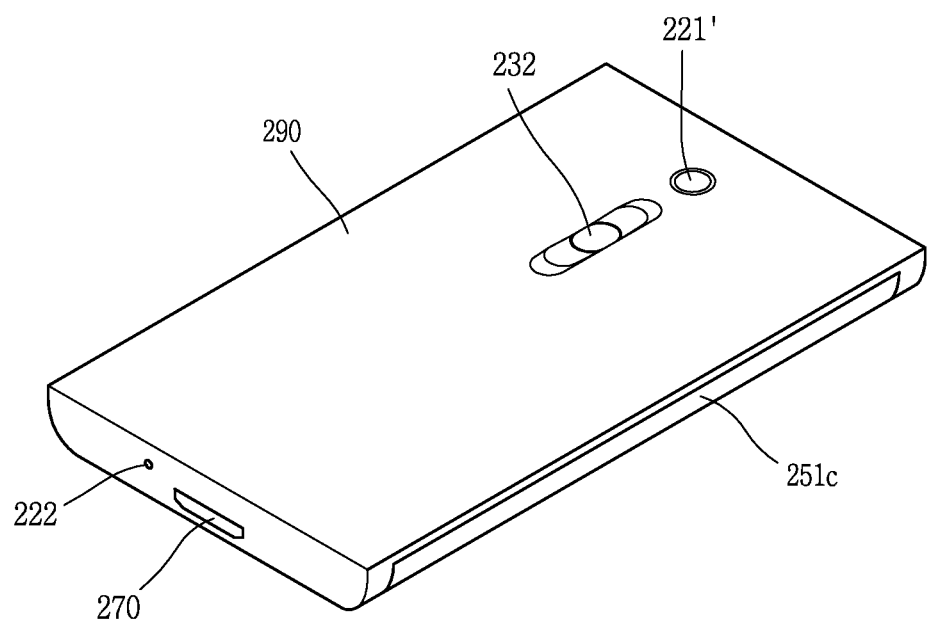

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Describing the display unit 151, according to the present invention, the display unit 151 is formed to be displayed on a side surface as well as a front surface of a mobile terminal. Thus, the display unit may be formed to have a more larger screen. In other words, the present invention presents the mobile terminal including the front and side displays and provides a new type of a user interface using the same. Hereinafter, the front and side displays and operations implemented thereby will be described in greater detail with reference to the drawings.

FIGS. 1B and 1C are a view illustrating a mobile terminal 200 according to an embodiment of the present invention when viewed from different directions.

The mobile terminal 200 disclosed herein is provided with a bar-type terminal body. However, the present invention may not be limited to this, but also may be applicable to various structures such as a slide type, a folder type, a swing type, a swivel type, or the like, in which two and more bodies are combined with each other in a relatively movable manner.

The body includes a case (casing, housing, cover, etc.) forming the appearance of the terminal. In this embodiment, the case may be divided into a front case and a rear case (refer to FIGS. 3A and 3B). Various electronic components is incorporated into a space formed between the front case and the rear case. At least one middle case may be additionally disposed between the front case and the rear case.

The cases may be formed by injection-molding a synthetic resin or may be also formed of a metal, for example, stainless steel (STS), titanium (Ti), or the like.

A display unit 251, an audio output unit 252, a camera module 221, etc. may be disposed on the front surface 201 of the terminal body, and an interface unit 270, etc. may be provided on side surfaces of the front case 201 and the rear case 202.

The display unit 251 occupies most of the front case 201. In other words, the display unit is disposed on the front surface of the mobile terminal, and formed to display visual information. Also, the display unit 251 of the present invention is formed to extend to other surface of the mobile terminal in addition to the front surface. More specifically, the display unit 251 includes a front display 251a disposed on the front surface, and side displays 251b and 251c extending from the front display area 251a and disposed on side surfaces of a body. Here, the front display 251a may be formed to have a first curvature, and the side display areas 251b and 251c may be formed to have a second curvature different from the first curvature.

For example, a window disposed on the front of the display unit 251 is formed in the form in which both side surfaces thereof are curved, and thus the external appearances of the front and side surfaces of the body are formed by the window. Therefore, the front display area 251a and the side display areas 251b and 251c may be connected to one another in the form having no physical boundary. In this case, the display unit 251 may be formed in a curved shape and include a built-in display element corresponding to the window.

Meanwhile, although now shown, in another embodiment, the front display area 251a and the side display areas 251b and 251c may be connected to one another in the form having a physical boundary. In this case, the front display area 251a, the first display area 251c and the second side display area 251b may be respectively formed in the form in which separate display modules are connected to one another.

In another embodiment, the display unit 251 may be a flexible display. The flexible display may be displays that can be bent, curved, twisted, folded, or rolled by an external force. Here, the flexible display unit may be both a typical flexible display and e-paper.

Here, the typical flexible display may be a lightweight, unbreakable and durable display that can be bent, curved, folded, or rolled like paper and is manufactured on a thin and flexible substrate while maintaining display characteristics of an existing flat panel display.

In addition, the e-paper is of display technology to which characteristics of a typical ink are applied, and may be different from a typical flat panel display in term of use of reflected light. In the e-paper, a picture or a character may be changed by using a twist ball or an electrophoresis technique using a capsule.

As described above, the mobile terminal body having the form in which the both side surfaces of the display unit are curved due to characteristics of a flexible material may be formed.

The audio output unit 252 and the camera module 221 may be disposed at an area adjacent to one end of the both ends of the display unit 251, and a front input unit (not shown) and a microphone 222 may be disposed at an area adjacent to the other end.

The front input unit is one example of user input unit 123 (see FIG. 1A), and may include a plurality of manipulating units. The manipulating unit may also be generally referred to as a manipulating portion. Any method may be used as long as the manipulating unit is used by a tactile manner that is manipulated using a user's tactile input.

The display unit 251 may also form a touch screen together with the touch sensor. Here, the touch screen may serve as the user input unit 123. Therefore, the touch screen may replace at least some of the functions of a front input unit. In this case, the mobile terminal may be configured so that input to the terminal body can be performed through the display unit 251 and a rear input unit 232 to be explained later.

Referring to FIG. 1C, a camera module 221' may be additionally mounted at a rear surface of the terminal body, namely, the rear case 202. The camera module 221' has an image capturing direction, which is substantially opposite to the direction of the camera module 221 (refer to FIG. 3A), and may have a different number of pixels from that of the camera module 221.

For example, it is preferable that the camera module 221 has a relatively small number of pixels enough not to cause difficulty when the user captures his or her own face and sends it to the other party during a video call or the like, and the camera module 221' has a relatively large number of pixels since the user often captures a general object that is not sent immediately. The camera modules 221 and 221' may be provided in the terminal body in a rotatable and popupable manner.

Furthermore, a flash and a mirror may be additionally disposed adjacent to the camera module 221'. The flash illuminates light toward an object when capturing the object with the camera module 221'. The mirror allows the user to look at his or her own face, or the like, in a reflected way when capturing himself or herself (in a self-portrait mode) by using the camera module 221'.

An audio output unit (not shown) may be additionally disposed at a rear surface of the terminal body. The audio output unit together with the audio output unit 252 (refer to FIG. 1B) can implement a stereo function, and may be also used to implement a speaker phone mode during a phone call.

That is, the audio output unit 252 (first audio output unit), configured as a receiver, may be formed on the front surface of the mobile terminal. And the audio output unit (second audio output unit), configured as a speaker, may be formed on the rear surface of the mobile terminal. However, the present invention is not limited to this. That is, the second audio output unit may be provided on the side surface of the mobile terminal.

A power supply unit 290, configured to supply power to the mobile terminal 200, is mounted to the terminal body. The power supply unit 290 may be mounted in the terminal body, or may be detachably mounted to the terminal body.

A rear input unit 232 may be disposed on the rear surface of the terminal body. The rear input unit 232 may be positioned below the camera module 221', for example.

The rear input unit 232 can be manipulated by a user to provide input to the mobile terminal 200. The input may be used in a variety of different ways. For example, the rear input unit may be used by the user to provide an input for power on/off, start, end, scroll, control volume level being output from the audio output unit 252, switch to a touch recognition mode of the display unit 251, and the like. However, the present invention is not limited to this. The mobile terminal may be provided with only one of the front input unit and the rear input unit 232.

According to a mobile terminal related to the present invention that includes at least one of configurations described above, a display unit 251 of a mobile terminal 200 includes a front display area 251a that is disposed on the front surface of the mobile terminal and formed to have a first curvature, and a plurality of side display areas 251b and 251c that extend from the front display area, are disposed on side surfaces and are formed to have a second curvature.

Here, the first curvature has a curvature value of a status that the display unit 251 is not bent (e.g., a status having the infinite radius of curvature), and indicates the case in which the curvature value is zero (0). Also, the second curvature has a curvature value of a status that the display unit 251 is bent (e.g., a status having the finite radius of curvature), and indicates the case in which the curvature value is a positive number excluding zero (0). In order words, the front display area formed to have the first curvature may be formed in a plane shape, and the side display areas formed to have the second curvature may be formed in a curved form.

Furthermore, in another embodiment, the front display area and the side display areas are all formed in a curved shape or in a plane shape. For example, when the front and side display areas are all formed in a plane shape, the display module forming the front display area and a plurality of display modules forming the side display areas may be provided separately. Alternatively, an integrated structure obtained by combining such a plurality of display modules may be provided.

At least a part of an execution screen of an application may be output to the front display area, and a sensing unit 140 (see FIG. 1A) of the mobile terminal may sense a touch input applied to the execution screen.

Here, the application may include a widget or a home launcher and may be all types of software programs that can be driven in the mobile terminal. Therefore, the application may be, for example, programs performing functions of a web browser, moving image reproduction, message transmission and reception, schedule management, and an update of an application. On the other hand, while an operation method will be described below mainly using the moving image reproduction as an example, embodiments of the present are limited thereto. Of course, the same may be applied to the above-mentioned application.

The touch input may include a touch gesture input, for example, an input received by a proximity touch input or a direct touch input, which is applied to the display unit 251 having the execution screen output thereto. For example, the touch input may be a single short-touch input or a double short-touch input applied to an area having the execution screen output thereto.

As described above, when at least a part of the execution screen of the application is output to the front display area and the touch input is sensed with respect to the execution screen, a control unit 180 (see FIG. 1A) of the mobile terminal outputs at least a part of a graphic object associated with control of the execution screen to an interface region located between the front display area and the side display area.

Here, the graphic object associated with the control of the execution screen may include a scroll of the execution or a scroll bar for moving an output position and be all types of control keys configured to execute a specific function based on a drag input.

Further, the interface region located between the front display area and the side display area of the display unit 251 may be a position or area in which an outer edge of the front display area and an outer edge of the side display area meet.

The interface region located between the front display area and the side display area of the display unit 251 may be a peak of a curvature surface when the side display area that meets the edge of the front display area is regarded as one projected curvature surface.

The interface region located between the front display area and the side display area of the display unit 251 may be an area including the boundary area of the front display area and the boundary area of the side display area in a corner that the front and side display areas meet.

In view of a structure of the mobile terminal, a portion that transitions from the front display area formed in a plane shape to the side display area formed in a curved shape has necessarily a predetermined gradient.

In this case, when a menu associated with control of the execution screen output to the display unit 251, for example, a scroll bar is output to an edge of the front display area, it may be difficult for the user to stably input the dragging and the side display are may not be sufficiently used due to the above-described gradient. When the menu associated with the control of the execution screen output to the display unit 251, for example, the scroll bar is output to the side display area, it may be difficult for the user to straightly input the dragging and the user should change his or her posture in order to input the dragging or tilt the mobile terminal body due to the side display area formed in a curved form.

In order to solve these disadvantages, the control unit 180 of the mobile terminal according to the present invention may perform control such that a graphic object associated with control of an execution screen, in particular, a graphic object receiving an input of a predetermined control command based on a drag input is output to an interface region located between a front display area and a side display.

As described above, by outputting the graphic object associated with the control of the execution screen to the interface region located between the front and side display areas, it is possible to assist the user to stably input the dragging and thus perform control of the execution screen, for example, scrolling the screen or moving the output screen, according to the user's intention.

A control method of a mobile terminal associated with an embodiment of the present invention will be described below in greater detail with reference to FIGS. 2, and 3A to 3D.

Figure 2:
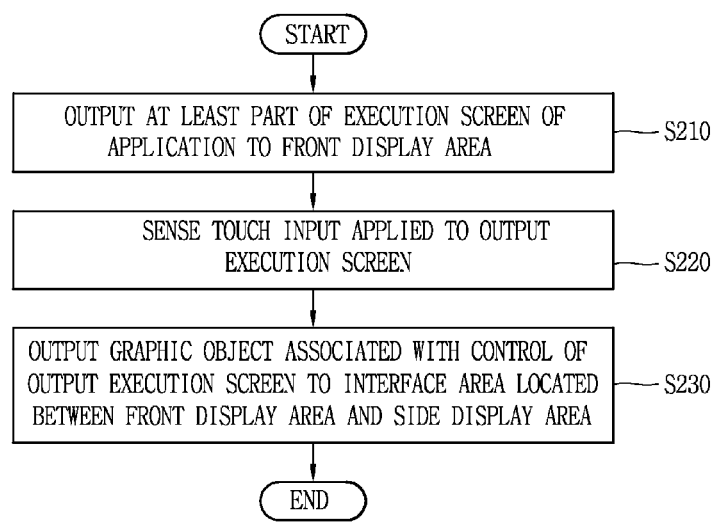
FIG. 2 is an exemplary flowchart for describing a control method of a mobile terminal related to an embodiment of the present invention.

FIG. 2 is an exemplary flowchart illustrating a method of outputting a graphic object associated with control of a screen using front and side display areas in accordance with an embodiment of the present invention. Also, FIGS. 3A to 3D are conceptual diagrams for describing the flowchart of FIG. 2.

First, description will be given under the assumption that the display unit 251 according to the embodiment of the present invention includes a front display area that is disposed on the front surface of a body and formed to have a first curvature, and side display areas that extend from the front display area, are disposed on side surfaces of the body and are formed to have a second curvature as described above.

In FIG. 2, the mobile terminal according to the embodiment of the present invention may first output at least a part of a screen corresponding to execution of a specific application to the front display area of the display unit 251 (see FIG. 1A) (S210).

In other words, the screen corresponding to the execution of the specific application may be output only to the front display area or output to extend to the side display areas in addition to the front display area. In the former case, icons for executing at least one function associated with the screen, alarm information (e.g., a received message or an incoming phone call) or separate information associated with user-friendly information such as other status display bars may be output to the side display area.

Here, the specific application may include all types of programs that can be driven in the mobile terminal like the execution screens corresponding to a web application, a gallery application, a message application, and the like and may be an execution screen that the user input is possible while scrolling the screen or moving the output position, in particular, when all information is not output to the display unit 251 at a time.

In addition, the screen corresponding to the execution of the application may be output to the front display area and the side display area extending from the front display area. Accordingly, an effect of the screen appearing to expand be obtained.

Figure 3A:
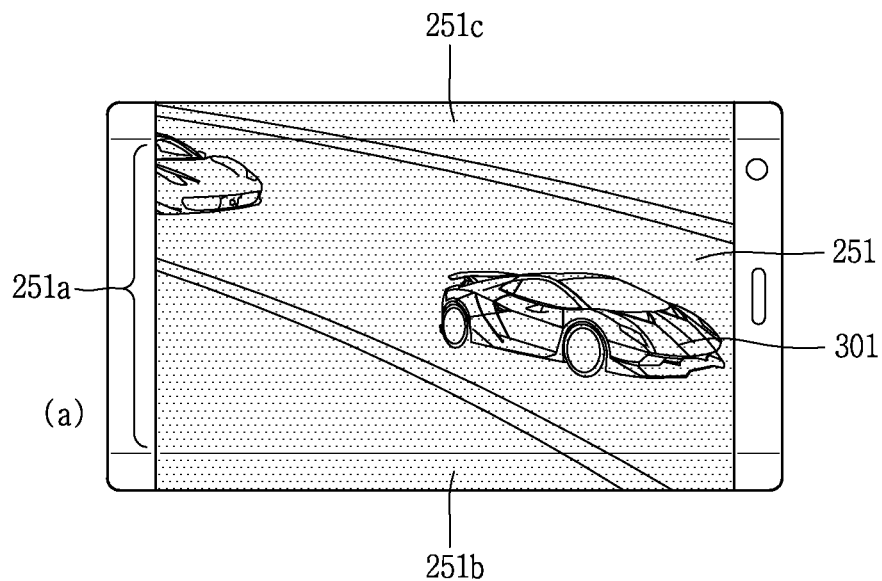
FIGS. 3A to 3D are conceptual diagrams for describing the flowchart of FIG. 2.
Figure 3A:
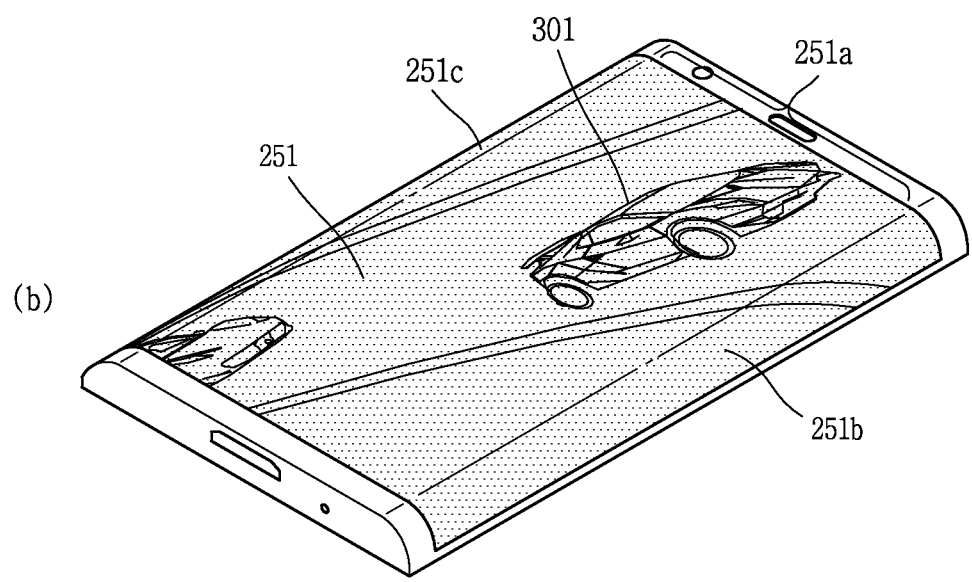

For example, referring to FIG. 3A, when a moving image screen 301 corresponding to execution of a gallery application is output to a display unit 251, as illustrated in (a) and (b) of FIG. 3A, the moving image screen 301 may be output to extend to a plurality of side display areas 251b and 251c in addition to a front display area 251a.

Next, in the mobile terminal, a touch input applied to the screen output to the display unit 251 may be sensed (S220). Here, the touch input may be, for example, a touch gesture input such as a short-touch input or a double short-touch input. When such a touch gesture input is applied, a control unit 180 of the mobile terminal may recognize this as an input of a control command for outputting a menu associated with the control of the output screen.

When the control command for outputting the graphic object associated with the control of the output screen as described above, the control unit 180 performs control such that the graphic object is output to an interface region located between the front display area and the side display area of the display unit 251 (S230).

Here, the graphic object may be an image that causes at least one control function associated with the screen output to the display unit 251 to be executed and be, for example, any one of a scroll bar for scrolling a screen, a reproduction bar associated with video reproduction, a volume bar for adjusting a video volume, or a progress bar for checking and moving a video output position.

Here, as described above, the interface region may be a position or area in which an outer edge of the front display area and an outer edge of the side display area meet. In addition, the interface region may be a peak of a curvature surface when the side display area that meets the edge of the front display area is regarded as one projected curvature surface. The interface region may be an area including the boundary area of the front display area and the boundary area of the side display area in a corner that the front and side display areas meet.

In other words, to minimize hiding of the screen, the menu associated with the screen control may be output to the edge area as possible. However, since the side display area has a narrow width and a curved area formed to extend to the rear surface of the mobile terminal, it is difficult for the user to stably input the dragging. Further, in an inner edge area of the front display area, it is also difficult for user to stably input the dragging because of slipping of a user's hand due to an inclination of the side display area. On the other hand, when the graphic object is output to the interface region located between the front display area and the side display area, since the dragging is input along a projected boundary line having a narrow width, the dragging may be input more stably. That is, a structure and a positional characteristic of the interface region assist the user such that his or her straight dragging is not input to an area other the interface region.

Figure 3B:
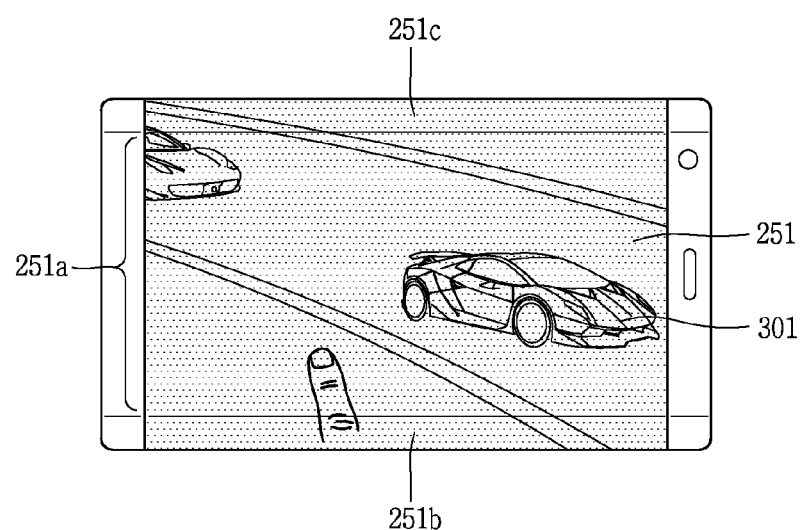
Figure 3C:
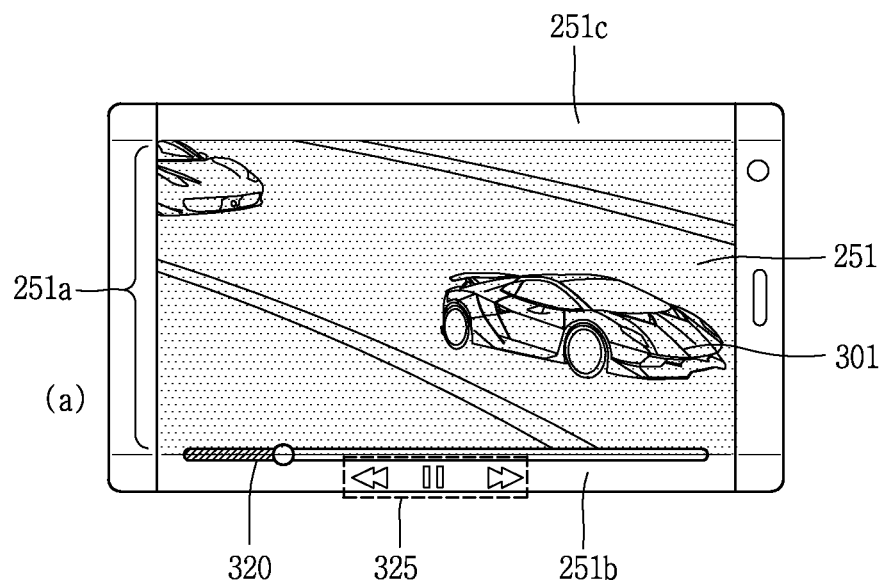
Figure 3C:
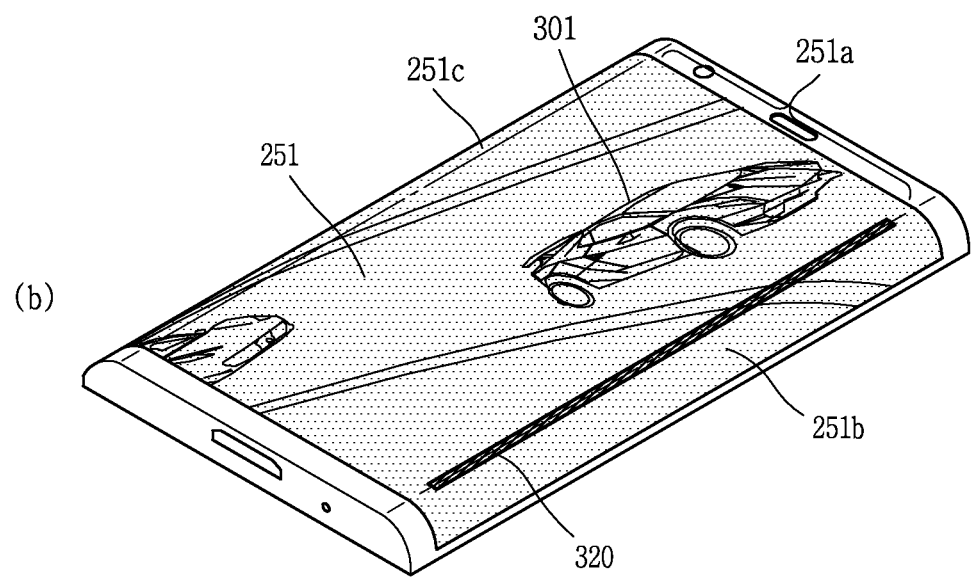
Figure 3D:
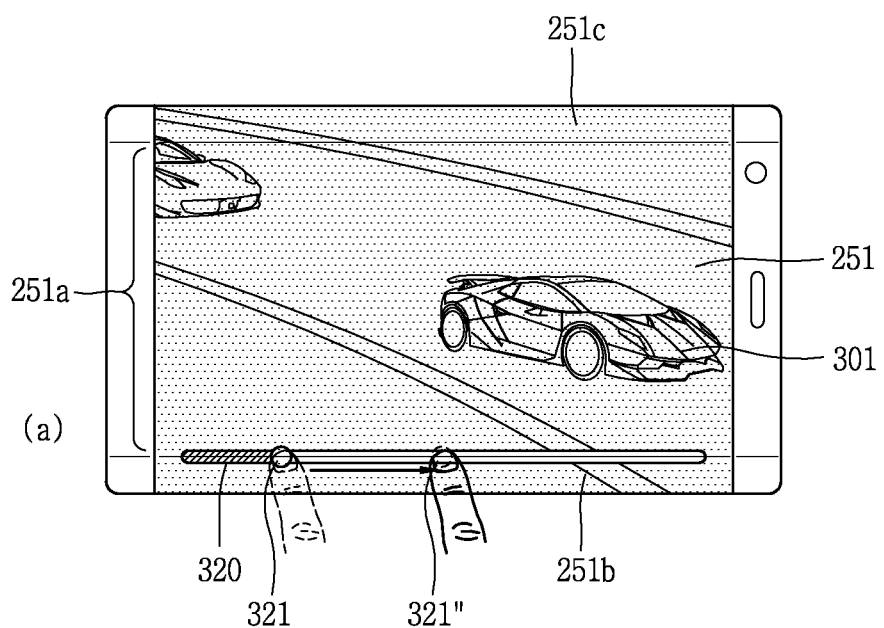
Figure 3D:
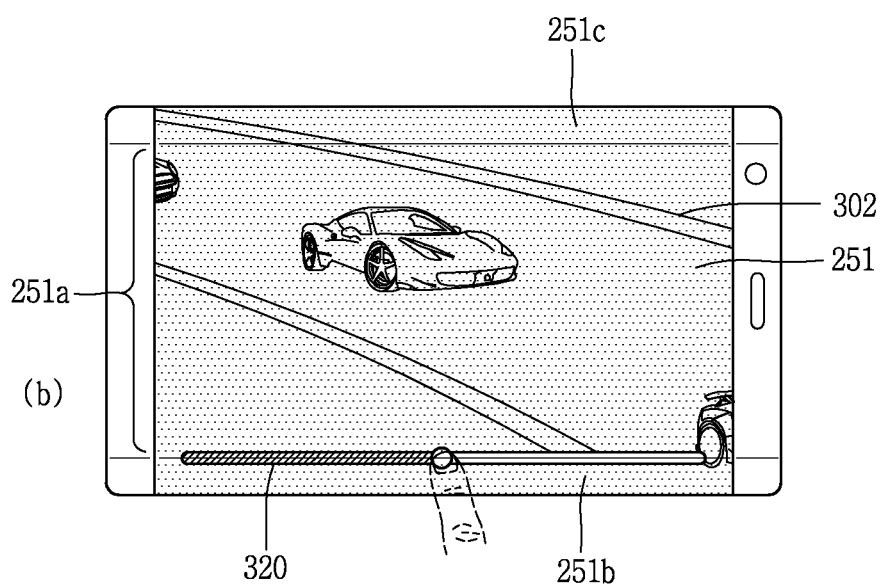

For example, referring to FIGS. 3B and 3C, while a moving image screen is output to the display unit 251, when the user's touch input is applied to the output moving image screen (see FIG. 3B), as illustrated in (a) and (b) of FIG. 3D, a reproduction bar 320 is output to an interface region located between the front display area 251a and the side display area 251b extending from a lower end of the front display area 251a.

As described above, when the graphic object is output to the interface region located between the front and side display areas, the control unit 180 may differently change the execution screen output to the display unit 251 in response to the fact that the dragging input applied to the graphic object is moved from one position in the graphic object to another position.

Specifically, the graphic object may include information indicating a position of the execution screen output to the display unit 251. Such information may be expressed in the form of an image representing a text indicating a detailed time and a relative position in a screen that can be output entirely.

As described above, when the graphic object is output to the interface region located between the front and side display areas, the control unit 180 may control the output range of the execution screen depending on the extent of the dragging input applied to the graphic object, and display additional information corresponding to the drag input on a position adjacent to the graphic object.

In this case, since the interface region located between the front and side display areas is an area having a very narrow width, a display of the additional information may be output to the front display area or the side display area.

For example, referring to FIG. 3D, when a moving element 321 included in the reproduction bar 320 is moved from the left side to the right side 321" and then a touch-up is performed like (a) of FIG. 3D while the reproduction bar 320 that is a control menu associated with screen reproduction is output to the interface region located between the front display area 251a and the side display area 251b of the mobile terminal, the screen is changed to the moving image screen 301 of a position of being proportional to the moving like (b) of FIG. 3D. Although not shown, while the drag input is maintained, a thumbnail (now shown) of a scene corresponding to the dragging input applied to the moving element 321 included in the reproduction bar 320 and/or additional information such as time information may be output to the front display area 251a or the side display area 251b rather than the interface region.

Meanwhile, the control unit 180 of the mobile terminal 100 may perform an operation of sensing the touch input (S220) and then may further perform an operation of sensing an inclination of the mobile terminal using a gyro sensor (not shown) or the like. Also, based on a result of the sensing as described above, the control unit 180 may determine whether the mobile terminal is in a horizontal viewing mode or in a vertical viewing mode. Accordingly, the control unit 180 may determine the output position of the menu associated with the screen control.

Figure 4:
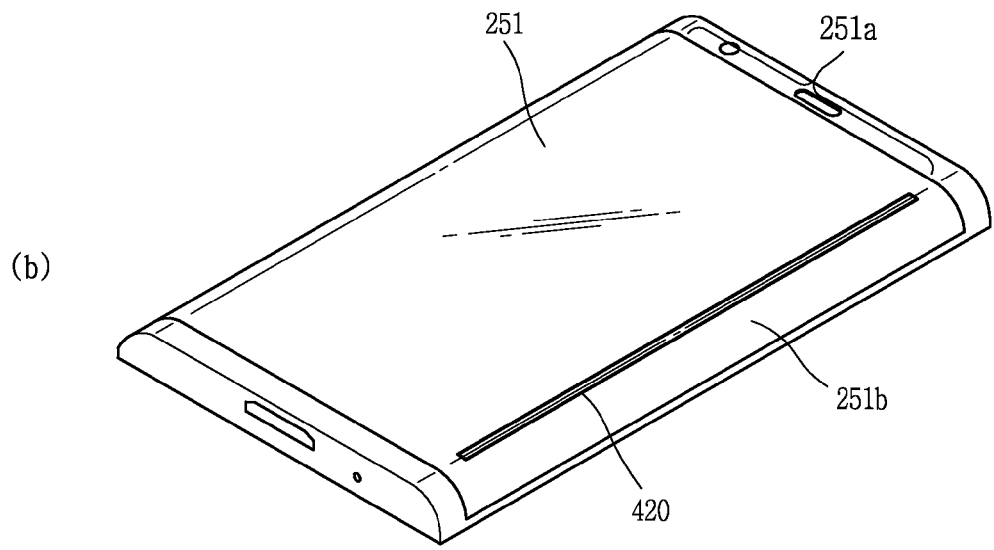
FIG. 4 is a view showing a change in a position of a graphic object associated with screen control depending on an inclination of a body in accordance with an embodiment of the present invention.
Figure 4:
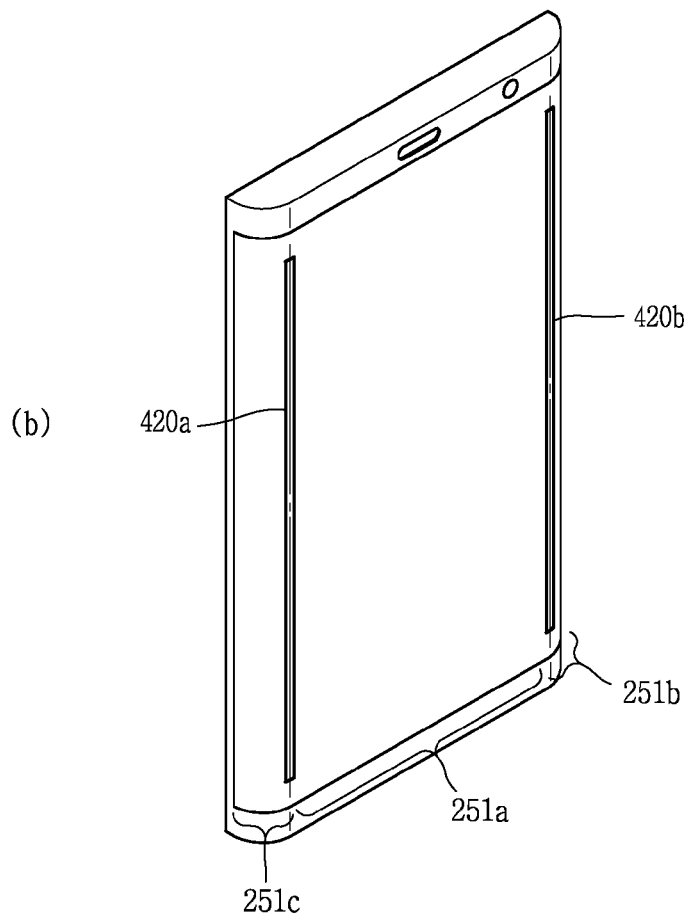

In this regard, FIG. 4 is a view showing a change in a position of a graphic object associated with screen control is changed depending on an inclination of a body in accordance with an embodiment of the present invention.

To this end, the sensing unit 140 of the mobile terminal 100 may further sense an inclination of the display unit 251 using the gyro sensor (not shown). Thus, the control unit 180 may determine the display unit 251 is in a horizontal viewing mode or in a vertical viewing mode. Furthermore, the control unit 180 may further determine whether an amount of information to be output on the screen is greater in a horizontal direction or in a vertical direction.

The control unit 180 may determine a direction of outputting the graphic object associated with the screen control based on the horizontal or vertical viewing mode and the amount of information in the output screen to be output of the determined display unit 251.

More specifically, the control unit 180 may output the graphic object formed to enable the dragging to be input in a horizontal direction to the interface region in response to the fact that the display unit 251 is inclined to be the horizontal viewing mode.

For example, in (a) of FIG. 4, while the display unit 251 is output in the horizontal mode, a menu key (e.g., a scroll bar, a reproduction bar, a volume bar, a progress bar, and the like) associated with the control of the output screen is output to an interface region 420 located between the front display area 251a and the side display area 251b disposed at a lower end of the front display area 251a in a horizontal direction.

The control unit 180 may output the graphic object formed to enable dragging to be input in a vertical direction to the interface region in response to the fact that the display unit 251 is inclined to be the vertical viewing mode. For example, in (b) of FIG. 4, while the display unit 251 is output in the vertical viewing mode, a key (e.g., a scroll bar, a reproduction bar, a volume bar, a progress bar, and the like) associated with the control of the output screen is output to at least one of interface regions 420a and 420b located between the front display area 251a and both side display areas 251b and 251c of the front display area 251a in a horizontal direction.

In this way, when the graphic object associated with the control of the output screen coincides with the inclination direction of the display unit, by outputting the graphic object to the interface region located between the front and side display areas, that is, the peak (or an area including the peak) of the projected curvature surface, the dragging input applied to the graphic object may applied more stably.

In other words, the user's dragging is not input to an area other than the sensibly projected peak while the user inputs the dragging. As such, the user can control the screen in a stable and comfortable posture.

Meanwhile, there is a case in which the plurality of graphic objects associated with the control of the execution screen are output. As described above, when the first and second objects associated with the control of the execution screen are output at the same time, the control unit 180 may output at least a part of the first graphic object to the interface region and output the second graphic object to any one of the front display area and the side display area.

Meanwhile, the determined output direction of the graphic object differently faces the inclination of the display unit, that is, when the display unit 251 is in the horizontal viewing mode but the graphic object associated with the screen control is formed to enable the dragging to be input in the vertical direction, or when the display unit 251 is in the vertical viewing mode but the graphic object associated with the screen control is formed to enable the dragging to be input in the horizontal direction, even when the graphic object is output only to the front display area 251a of the display unit 251, the drag input does not unstable. However, even in such a case, in order to stably input and release the dragging, the graphic object associated with the screen control may not be output to a predetermined range of a boundary area of the front display area adjacent to the side display area.

As described above, according to the embodiment of the present invention, by outputting the menu bar associated with the screen control to the interface region located between the front and side displays, the dragging input for controlling the screen output to the display unit may be applied more stably.

Figure 5:
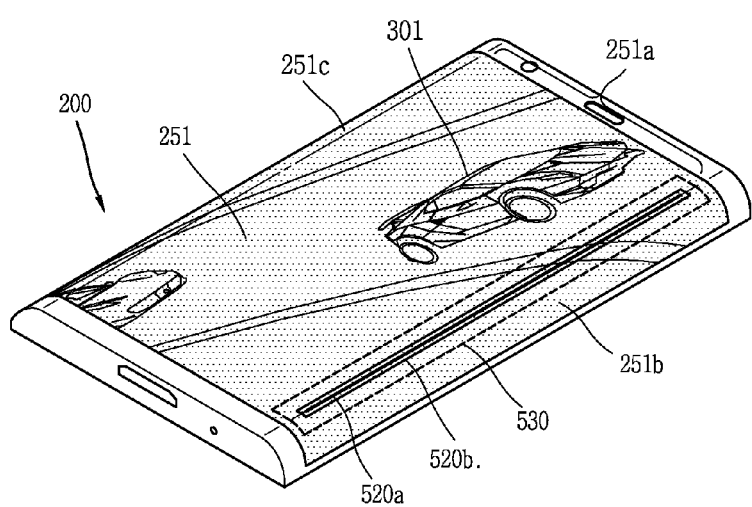
FIG. 5 is a view showing a sensing area of a dragging input applied to the graphic object of FIG. 4.

Hereinafter, FIG. 5 is a view specifically showing an input sensing area of dragging input applied to the graphic object of FIG. 4.

As described above, the interface region located between the front display area 251a and the side display area 251b or 251c of the display unit 251 has a very narrow width. As such, when it is configured such that the drag input is sensed only in the interface region, it may be difficult to stably input the dragging.

Therefore, the sensing unit 140 according to the embodiment of the present invention is implemented so as to sense the dragging input applied to the graphic object from an edge area of the front display area adjacent to the interface region and an edge area of the side display area adjacent to the interface region as well as the interface region.

Specifically, referring to FIG. 5, when the graphic object associated with the screen control, for example, a reproduction bar 520a is output to an interface region 520b located between the front display area 251a and the side display area 251b, a sensing area of dragging input applied to the reproduction bar 520a may be set to be wider than the interface region 520b.

Furthermore, in FIG. 5, an example implemented in the form including the reproduction bar 520a in the interface region 520b is illustrated. However, since the interface region 520b has a very narrow width, in another example, the reproduction bar 520a and the interface region 520b may be implemented such that their widths coincide with one other. Alternatively, when the interface region 520b has a width smaller than that of the reproduction bar 520a, it is also possible to implement the interface region 520b and the reproduction bar 520a such that the center line of the reproduction bar 520a is disposed at the interface region 520b.

In the foregoing description, when the interface region outputting the graphic object associated with the screen control has a very narrow width, description has been given under the assumption that the interface region is of one position or one area. Hereinafter, when the interface region can be partitioned into a plurality of areas, a method of outputting a graphic object will be described in detail.

Figure 6:
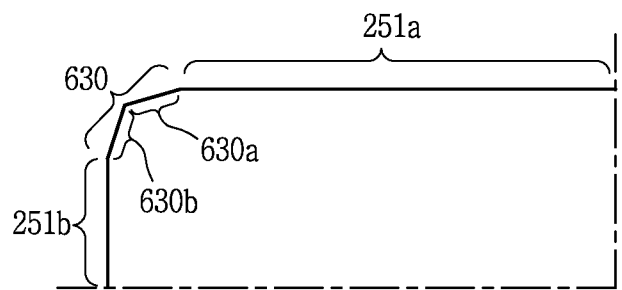
FIG. 6 is a view for describing an output position of a graphic object associated with screen control when an interface region between front and side displays is partitioned into a plurality of areas in accordance with an embodiment of the present invention.
Figure 6:
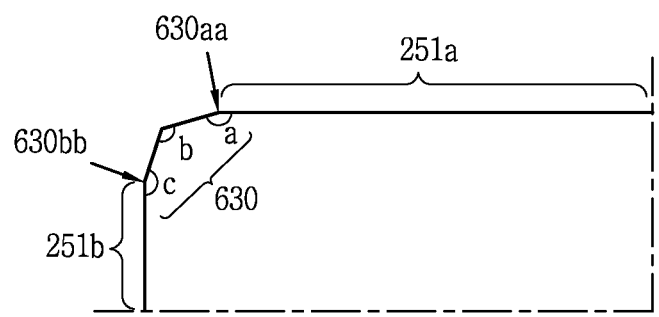
Figure 6:
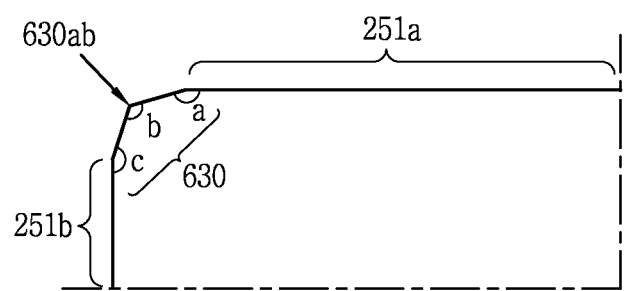

In this regard, FIG. 6 is a view for describing an output position of a graphic object associated with screen control when an interface region located between front and side displays can be partitioned into a plurality of areas in accordance with an embodiment of the present invention.

For example, as illustrated in FIG. 6, the front display 251a may have a first curvature value (i.e., a curvature value is 0) in which the display unit 251 has an infinite curvature radius, and the side display area 251b may have a second curvature value (i.e., a curvature value is a positive number excluding zero (0)) in which the display unit 251 has a finite curvature radius. However, it is said in advance that the side display area 251b having the second curvature value (i.e., the curvature value is a positive number excluding zero (0)) illustrated in FIG. 6 is exaggerated and illustrated as if the interface region were a straight line (i.e., the interface region had the first curvature value) in order to explain that an interface region 630 and a curvature are different.

As illustrated in FIG. 6, the interface region 630 may be implemented so as to include a first area 630a formed to have a third curvature and a second area 630b that extends from the first area 630a and is formed to have a fourth curvature. In other words, the interface region 630 may include the plurality of areas 630a and 630b that can be partitioned. Here, the third and fourth curvatures may have at least values different from the first and second curvatures.

In this way, when the interface region can be partitioned into a plurality of areas having different curvatures, the control unit 180 may perform control such that the graphic object is output to a position or area in which the first or second curvature is first changed.

Specifically, as illustrated in FIG. 6, the graphic object may be output to a position 630aa in which the curvature is first changed from the front display area 251a having the first curvature to a widthwise direction facing the side display area 251b, that is, a position in which the curvature is changed from the first curvature to the third curvature. Alternatively, the graphic object may be determined to be output to a position 630bb in which the curvature is first changed from the side display area 251b having the second curvature to a widthwise direction facing the front display area 251a, that is, a position in which the curvature is changed from the second curvature to the fourth curvature.

In addition, in another embodiment, when the interface region can be partitioned into a plurality of areas having different curvatures, the control unit 180 may perform control such that the graphic object is output to a boundary position or area having the greatest curvature or change extent in the curvature.

Specifically, referring to FIG. 6, as the boundary position or area in which the curvature is changed in the display unit 251, there may be broadly the boundary area 630 in which the curvature is changed from the first curvature to the second curvature, the boundary 630aa in which the curvature is changed from the first curvature to the third curvature, the boundary position 630ab in which the curvature is changed from the third curvature to the fourth curvature, and the boundary position in which the curvature 630bb is changed from the fourth curvature to the second curvature. As described above, in each boundary position in which the curvature is changed, there are angles a, b and c corresponding thereto. As a result obtained by comparing the angles, the boundary area 630ab having the smallest angle b is the boundary position having the greatest change extent in the curvature.

In other words, the graphic object is output to the boundary position having the largest projection extent in the interface region 630. In this way, when the graphic object associated with the screen control is output to the boundary position having the largest projection extent, the user's dragging is not easily sensibly input an area other than the relevant boundary position while the dragging is input. As such, it is possible to stably input the dragging.

Figure 7:
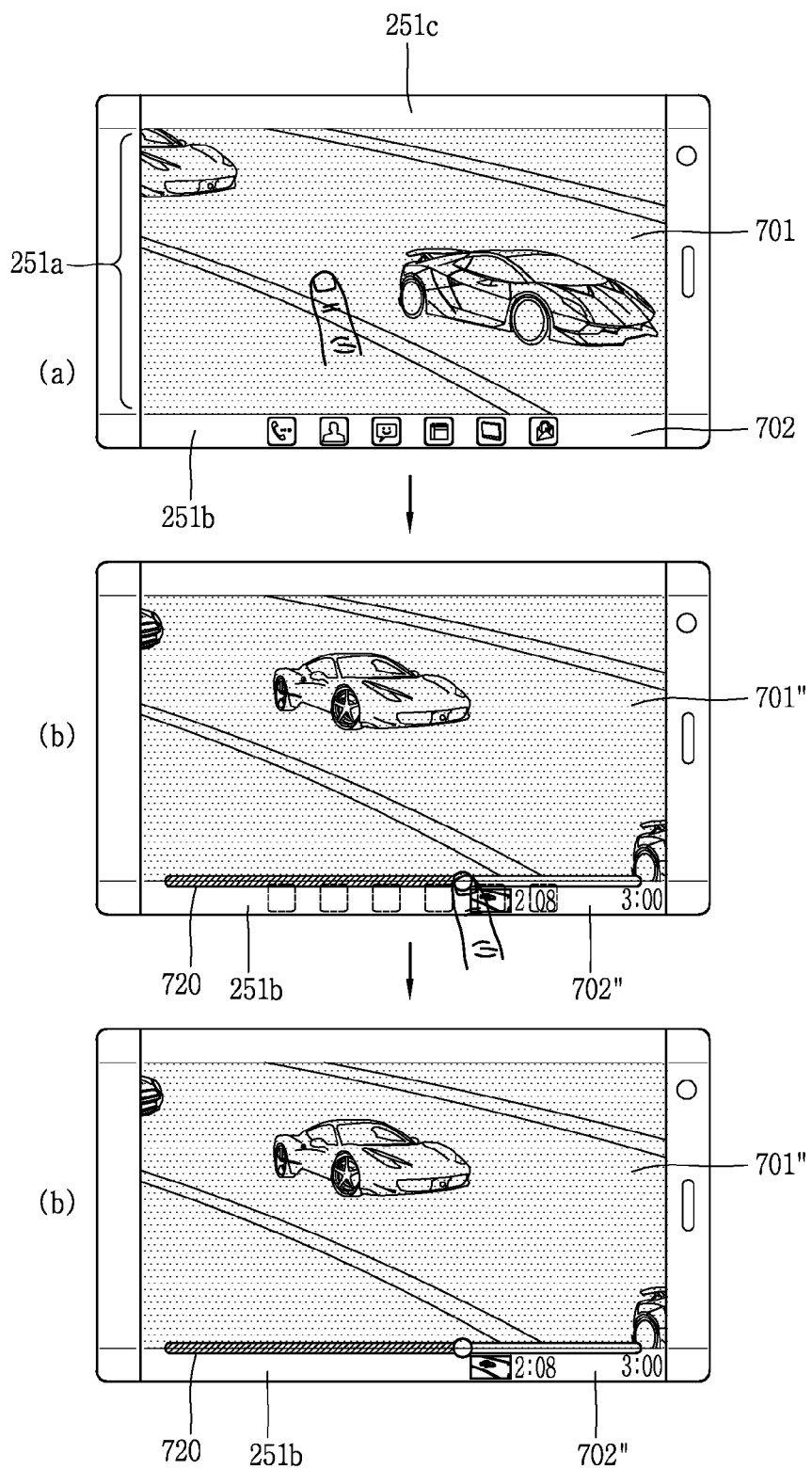
FIG. 7 is a view showing a change of visual information output to a side display at the time of outputting a graphic object associated with screen control in accordance with an embodiment of the present invention.

Hereinafter, FIG. 7 is a view showing a change of visual information output to a side display of a display unit 251 at the time of outputting a graphic object associated with screen control in accordance with an embodiment of the present invention.

As described above, while the screen corresponding to the execution of the specific application is output to the front display area 251a of the display unit 251, visual information corresponding to a user-friendly function such as an icon for executing at least one function associated with the screen, alarm information (e.g., a received message or an incoming phone call) or other status display bar may be output to the side display areas 251b and 251c. In this case, when the graphic object associated with the screen control is output to the interface region located between the front and side display areas, the function corresponding to the visual information output to the side display area 251b or 251c may be executed differently from the user's intention. Similarly, even when the user tries to execute the function associated with the visual information output to the side display area 251b or 251c, the function associated with the graphic object output to the interface region may be executed differently from the user's intention.

To this end, when at least a part of the graphic object is output to the interface region while the icons of the plurality of applications are output to the side display area, the control unit 180 may differently change the touch input method for executing the functions corresponding to the icons of the plurality of applications output to the side display area.

For example, if a long-touch input should be originally applied by way of example in order to execute the icons of the plurality of applications output to the side display area, after the graphic object is output to the interface region, the input method of the control command may be changed to a method in which a double touch input should be applied by way of example. That is, by requiring the user to apply a secondary input or a continuous input, it is possible to prevent the user from erroneously performing the unwanted function. In this case, when the graphic object disappears from the interface region, the input method may automatically return back to the original input method.

Alternatively, when at least a part of the graphic object is output to the interface region while the icons of the plurality of applications are output to the side display area, the control unit 180 may perform control such that the icons of the plurality of applications that have been output to the side display area disappear.

Meanwhile, the graphic object may be divided into a first portion sensing the drag input and a second portion different from the first portion. In this case, the control unit 180 may output the first portion associated with the drag input, for example, a reproduction bar to the interface region, and output the second portion, for example, additional visual information associated with a reproduction position to an edge area of the front display area adjacent to the interface region or an edge area of the side display area adjacent to the interface region.

In other words, since the interface region is a boundary position or area having a narrow width, it is difficult to display much information. As such, only the portion corresponding to the drag input may be output the interface region and the other portions may be output to another area.

For example, when a touch input is applied to a moving image screen 701 while the moving image screen 701 is output to the front display area 251a, and the other plurality of pieces of information, for example, icons 702 of other applications are displayed on the side display area 251b as illustrated in (a) of FIG. 7, a reproduction bar 720 is output to the interface region located between the front display area 251a and the side display area 251b, and the icons 702 that have been displayed on the side display area 251b disappear like (b) of FIG. 7. Also, additional information 702", for example, time information or a thumbnail of a specific scene that corresponds to the dragging input applied to the reproduction bar 720 may be displayed on the side display area 251b. On the other hands, when a predetermined time elapses after the dragging input applied to the reproduction bar 720 is released, the reproduction bar 720 disappears from the interface region, and the icons 702 appear on the side display area 251b again.

In addition, the control unit 180 may further perform control associated with output content and an output position of additional information associated with the graphic object output to the side display area and execution of the associated function.

Specifically, the control unit 180 may perform control such that visual information corresponding to moving of the dragging input applied to the graphic object output to the interface region is output to the side display area. Here, the visual information may be an image including a specific scene corresponding to the moving or information such as a control value and implemented in the form of a thumbnail. Furthermore, the control unit 180 may perform control such that the visual information is output to a position opposite to the moving direction of the drag input in the side display area. Thus, the visual information is not hidden depending on the user's drag input. In addition, when the touch input is applied to the visual information output to the side display area, the control unit 180 may perform control such that the screen corresponding to the visual information to which the touch input is applied is output to at least one area of the front display area.

Figure 8A:
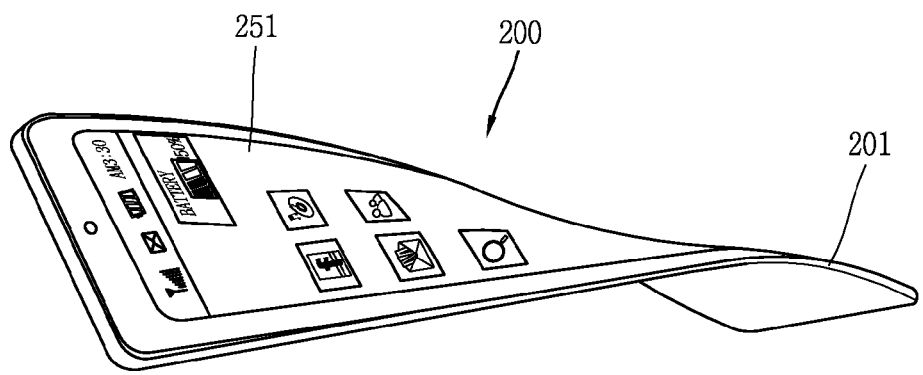
FIGS. 8A and 8B are views for describing the fact that an output position of a graphic object associated with screen control is changed as an external force is applied to a mobile terminal according to an embodiment of the present invention.
Figure 8B:
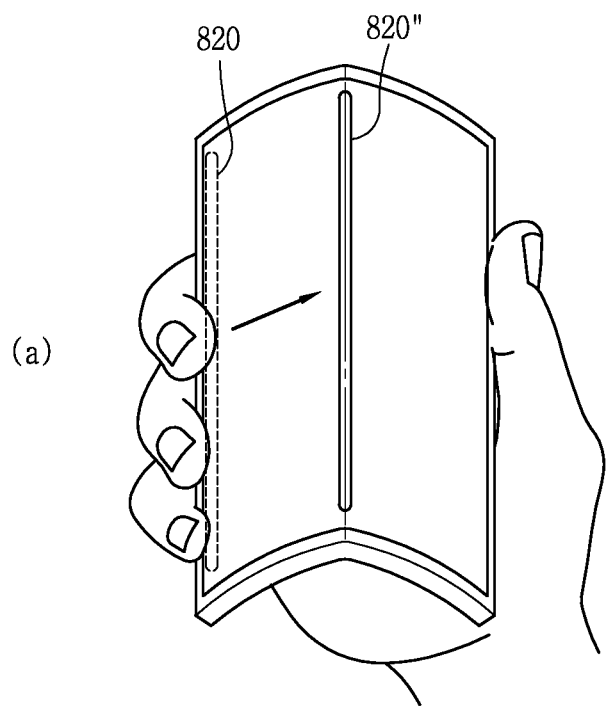
Figure 8B:
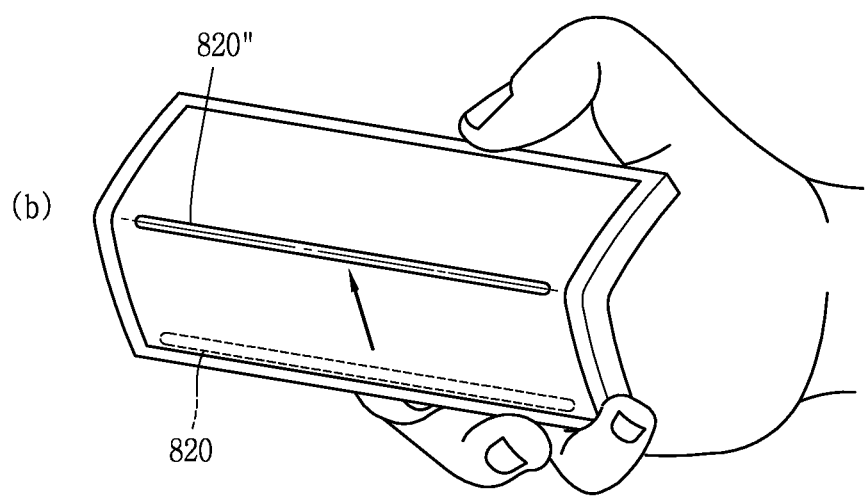

Hereinafter, FIGS. 8A and 8B are views for describing the fact that an output position of a graphic object associated with screen control is changed as an external force is applied to a mobile terminal according to an embodiment of the present invention.

Here, description will be given under the assumption that the display unit 251 is a flexible display unit that can be bent so as to change at least one of the first curvature and the second curvature by an external force.

In this regard, FIG. 8A is a conceptual diagram for describing an example of a mobile terminal that information or a screen processed in the mobile terminal according to an embodiment of the present invention is displayed using a flexible display and can be deformed by an external force.

As illustrated in the drawing, the display unit 251 may be configured to be deformable by an external force. The deformation may be at least one of bending, curving, folding, twisting and rolling. Such a deformable display unit 251 may be called a "flexible display unit." Here, the flexible display unit 251 may include all of a typical flexible display, e-paper and a combination thereof. In general, a mobile terminal 200 may include characteristics of the mobile terminal 100 of FIGS. 1A to 1C or characteristics similar to those.

The typical flexible display may be a lightweight, unbreakable and durable display that can be bent, curved, folded, twisted or rolled like paper and is manufactured on a thin and flexible substrate while maintaining display characteristics of an existing flat panel display.

Furthermore, the e-paper is of display technology to which characteristics of a typical ink are applied, and may be different from an existing flat panel display in term of use of reflected light. In the e-paper, a picture or a character may be changed by using a twist ball or an electrophoresis technique using a capsule.

In a state in which the flexible display unit 251 is not deformed (e.g., a status having an infinite curvature radius; hereinafter referred to as a first status), a display area of the flexible display unit 251 may have a plane shape. In a state in which the flexible display unit 251 is deformed by an external force in the first status (e.g., a status having a finite curvature radius, hereinafter referred to as a second status), the display area may have a curved shape. As illustrated in the drawing, information displayed in the second status may become visual information output to a curved surface. Such visual information is implemented by independently controlling emission of light of sub-pixels arranged in a matrix shape. Each of the sub-pixels may be a minimum unit for implementing one color.

The flexible display unit 251 may have a bent state (e.g., a horizontally or vertically bent state) in the first status rather than a flat state. In this case, when an external force is applied to the flexible display unit 251, the flexible display unit 251 may be deformed to a flat state (or a less bent state) or a more bent state.

Meanwhile, the flexible display unit 251 may implement a flexible touch screen by combining the flexible display unit 251 and a touch sensor. When a touch input is applied to the flexible touch screen, the control unit 180 (see FIG. 1A) may perform control corresponding to such a touch input. The flexible touch screen may be configured to sense the touch input in both the first status and the second status.

On the other hands, the mobile terminal 200 according to the modified example may be provided with a deformation sensing means that can sense deformation of the flexible display unit 251. Such a deformation sensing means may be provided for the sensing unit 140 (see 1A).

The deformation sensing means may be provided for the flexible display unit 251 or the case 201 and sense information associated with the deformation of the flexible display unit 251. Here, the information associated with the deformation may be a deformed direction, a deformed extent, a deformed position and a deformed time of the flexible display unit 251, and restoring acceleration of the deformed flexible display unit 251. In addition, the information associated with the deformation may be a plurality of pieces of various information that can be sensed due to bending of the flexible display unit 251.

The control unit 180 may change information displayed on the flexible display unit 251 or generate a control signal for controlling a function of the mobile terminal 200 based on information associated with deformation of the flexible display unit 251 sensed by the deformation sensing means.

Meanwhile, the mobile terminal 200 according to the modified example may include the case 201 accommodating the flexible display unit 251. The case 201 may be configured to be deformable along with the flexible display unit 251 by an external force in consideration of characteristics of the flexible display unit 251.

In addition, a battery (not shown) included in the mobile terminal 200 may be configured to be deformable along with the flexible display unit 251 by an external force in consideration of the characteristics of the flexible display unit 251. In order to implement the battery, a stack and folding technique in which battery cells are vertically stacked may be applied thereto.

The state deformation of the flexible display unit 251 is not limited only to a case in which the state deformation occurs by an external force. For example, when the flexible display unit 251 is in the first status, the flexible display unit 251 may be deformed to the second status.

The control unit 180 may perform control such that the graphic object output to the interface region is moved to a boundary position or area having the greatest change extent in the curvature due to an external in response to bending of the flexible display unit formed as described above due to an external force.

To this end, as described above, the mobile terminal may further include a means sensing a deformation extent, a deformation direction and the like of the flexible display unit 251. Moreover, the mobile terminal may sense the boundary position having the greatest change extent in the curvature, that is, the largest projected or recessed position due to the deformation of the flexible display unit 251. The result sensed in this way may be transmitted to the control unit 180 and used to determine a new position of the graphic object.

For example, referring to FIG. 8B, as illustrated in (a) and (b) of FIG. 8B, when the flexible display unit 251 is bent by an external force applied to the mobile terminal by a user's hand, a graphic object that has been output to an interface region 820 may be moved and displayed on a position 820" having the greatest change extent in the curvature (or which may be defined as the largest projected position). As described above, by outputting the graphic object to the position having the largest projection extent due to an external force, the dragging input applied to the graphic object in a linear direction may be applied more stably.

In this way, even when the graphic object is output to the position in which a sensibly stable dragging input may be applied, the dragging input may be applied to an area other than the output graphic object depending on the user's intention or differently from the user's intention in some cases. Hereinafter, as described above, an embodiment related to a process performed for a case of inputting the user's dragging to an area other than the graphic object will be described.

Figure 9A:
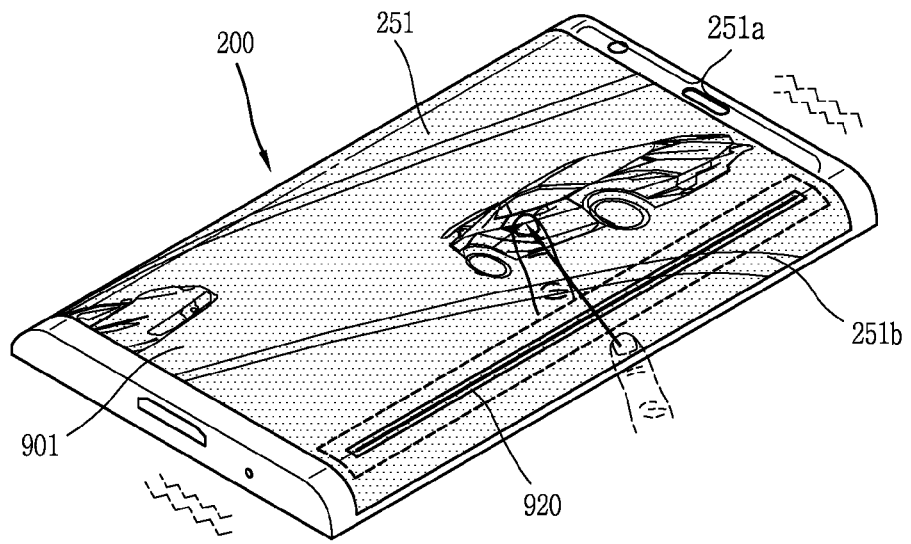
FIGS. 9A to 9C are views for describing a method of changing an output position of at least a part of a graphic object associated with screen control based on an input in accordance with an embodiment of the present invention.
Figure 9B:
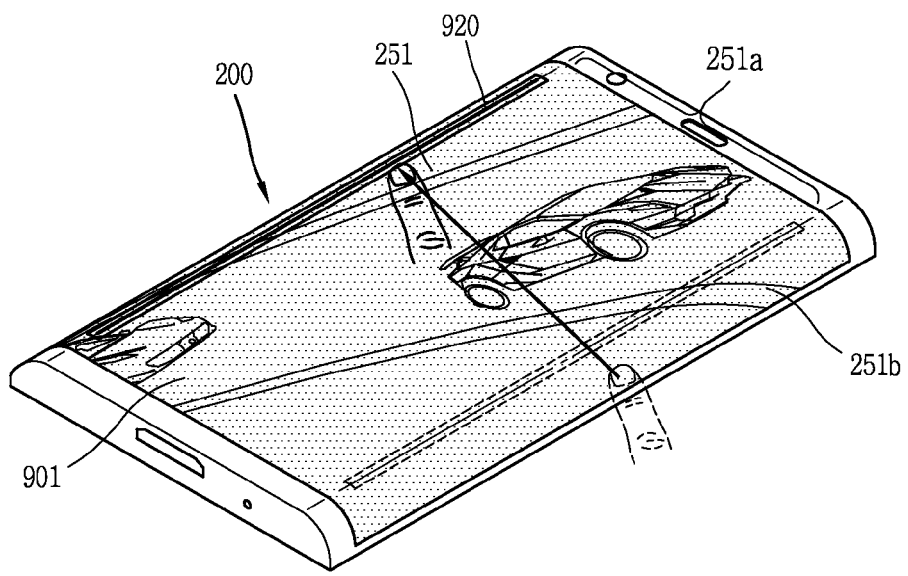
Figure 9C:
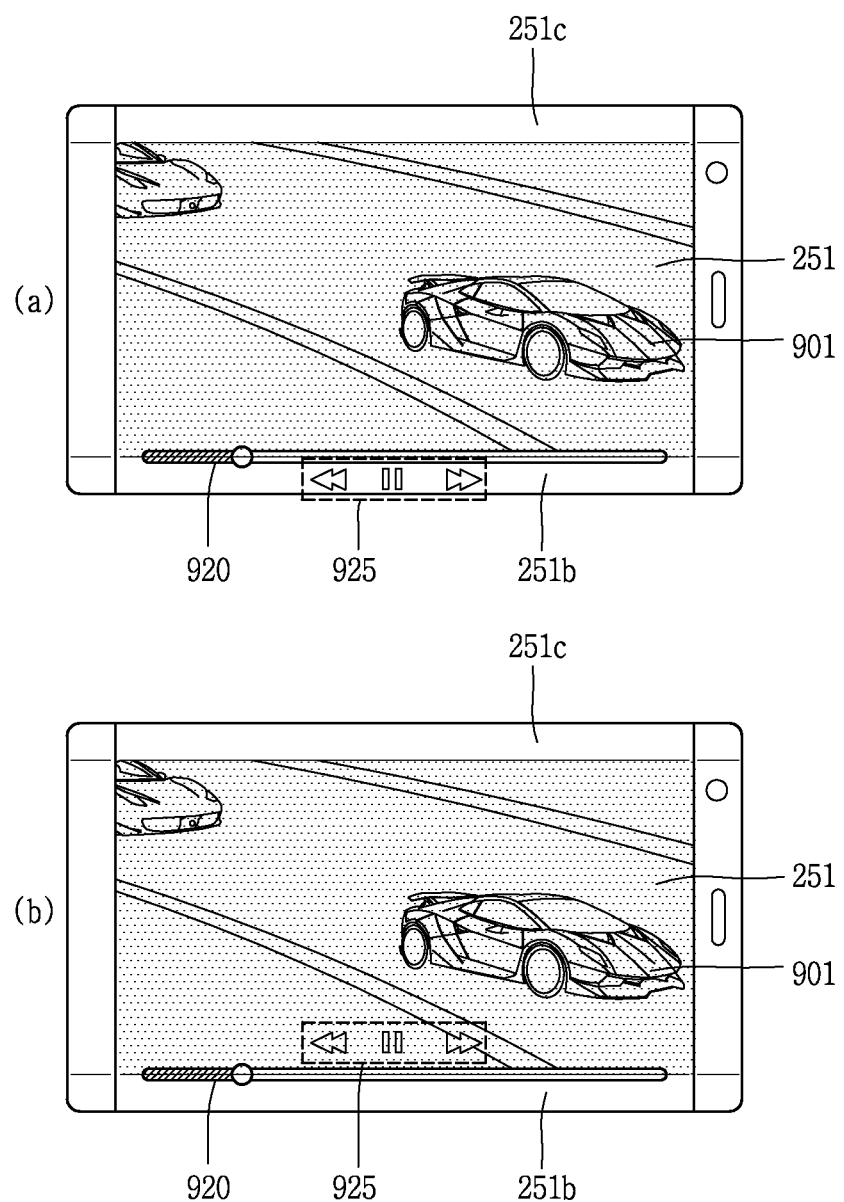

FIGS. 9A to 9C are views for describing a method of changing an output position of at least a part of a graphic object associated with screen control based on a user's input in accordance with an embodiment of the present invention.

First, when user's dragging is input to an area other than a graphic object within a predetermined range while the graphic object is output to an interface region located between the front display area 251a and the side display area 251b or 251c of the display unit 251 of the mobile terminal, the user's dragging may be determined to be input differently from the user's intention.

Specifically, when the dragging input applied to the graphic object is moved to one position of the front display area or the side display area within a preset range that leaves the graphic object by a criterion range or more, the control unit 180 may perform control such that a predetermined alarm is output. Also, the function corresponding to the dragging input applied to the area other than the graphic object may not be performed. In other words, when the user's dragging is determined to be input to the area other than the graphic object differently from the user's intention, it is possible for the user to prevent an erroneous input by outputting the predetermined alarm (e.g., vibration, message, or sound).

For example, when the dragging input applied to a graphic object 920 is moved to an area that is in an area other than the graphic object 920 and within a predetermined range (e.g., a range that does not exceed a half in a widthwise direction) of the front display area 251a while the graphic object 920 associated with the screen control is output to the interface region located between the front display area 251*a* and the side display area 251*b* as illustrated in FIG. 9A, a predetermined vibration alarm may be output in order to notify of the erroneous input.

Meanwhile, when the user's dragging is input to the graphic object to leave a predetermined range while the graphic object is output to the interface region located between the front display area 251*a* and the side display area 251*b* or 251*c* of the display unit 251 of the mobile terminal, the user's dragging may be determined to be input to the area other than the graphic object depending on the user's intention. In this case, the control unit 180 may move the graphic object to a position in which the drag input is released.

For example, as illustrated in FIG. 9B, the dragging input applied to the graphic object 920 is input to an area other than the graphic object 920 and thus leaves the predetermined range of the front display area 251*a* (i.e., when the user's dragging is moved close to a front display area that is disposed opposite in a widthwise direction) while the graphic object 920 associated with the screen control is output to the interface region located between the front display area 251*a* and the side display area 251*b*, the graphic object 920 may be moved and displayed on another side display area 251*c* that is disposed opposite based on the front display area 251*a*.

The control unit 180 may move additional information associated with the graphic object based on the user's input and display the additional information. In other words, when a preset touch input (e.g., a double short-touch input) is applied to a position in which the additional information is not displayed on the side display area while a first portion sensing a drag input is output to an interface region located between front and side display areas and a second portion different from the first portion, that is, the additional information is output to the side display area in the graphic object, the additional information that has been displayed on the side display area 251*b* like (a) of FIG. 9C may be moved and displayed on the front display area 251*a* (see (b) of FIG. 9C).

In the foregoing description, the change of the side display area at the time of outputting the graphic object associated with the screen control has been mainly described.

Hereinafter, a change of a screen that has been output to a display unit, in particular, a front display area when a graphic object associated with screen control is output will described in detail with reference to FIG. 10.

First, as described above, in the mobile terminal according to the embodiment of the present invention, the screen corresponding to the execution of the specific application may be output to extend to the interface region and the side display areas 251*b* and 251*c* in addition to the front display area 251*a*. In this case, in both the side display areas 251*b* and 251*c*, an output of visual information for executing other functions excluding the screen output may be defined to be an "inactive status."

In this way, when the touch input is sensed with respect to one area of the execution screen while at least a part of the screen is output to extend to the interface region and the side display area in addition to the front display area 251*a*, the control unit 180 may perform control such that a part of the execution screen that has been output to the interface region and the side display area is output only to the front display area. In this case, in the both side display areas 251*b* and 251*c*, an output of visual information for executing other functions excluding the screen output may be defined to be an "active status."

Figure 10:
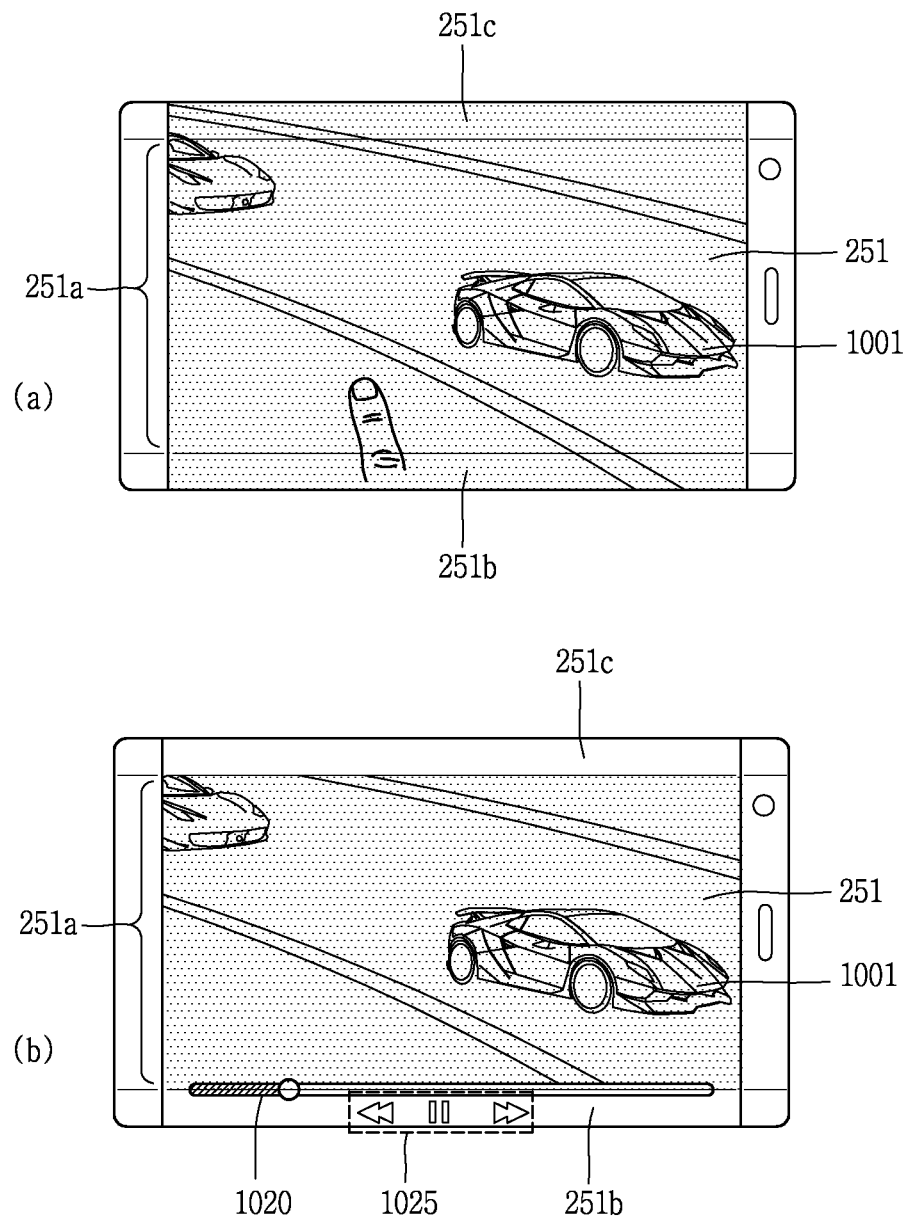
FIG. 10 is a view showing a change in a screen that has been output to a display unit at the time of outputting a graphic object associated with screen control in accordance with an embodiment of the present invention.

For example, when a user's touch input is applied to a moving image screen 1001 while the moving image screen 1001 output to the front display area 251*a* is output to extend to the side display areas 251*b* and 251*c* in (a) of FIG. 10, a reproduction bar is output to an interface region 1020, and the moving image screen 1001 is resized and output only to the front display area 251*a* like (b) of FIG. 10. Also, in the side display areas 251*b* and 251*c*, an output of visual information for executing other functions is "activated." In other words, a control keys (e.g., a rewinding key, a pause key, a fast forwarding key, or the like) associated with the reproduction bar may be output to the first side display area 251*b*, and visual information (e.g., a received message, an incoming phone call, or the like) corresponding to the alarm event may be output to the second side display area 251*c*.

Meanwhile, when the graphic object is output to the interface region located between the front and side display areas, visibility may be degraded due to the change of the curvature in some cases. To this end, when at least a part of the execution screen is output to extend to the interface region and the side display area in addition to the front display area, the control unit 180 may change a shape of the graphic object output to the interface region depending on the attributes in the background screen of the execution screen.

For example, in order to improve visibility, the graphic object may be changed to a color (e.g., complementary color) that contrasts with a color of the background screen output to the front and side display areas, in particular, each of the edge areas. Alternatively, in order to improve visibility, the graphic object may have the width displayed to be more widened depending on the attributes in the background screen of the execution screen.

In the foregoing description, various embodiments in which the graphic object associated with the control of the screen output to the display unit 251 is output to a position that can stably input the user's dragging have been described. An example in which the user's dragging associated with the control of the screen output to the display unit 251 can be stably input even without outputting such a graphic object will be described below in detail.

Figure 11:
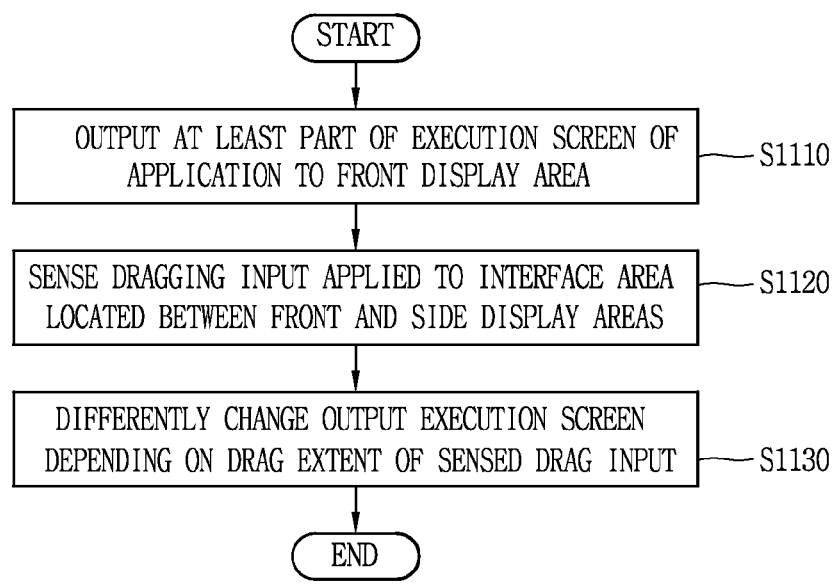
FIG. 11 is an exemplary flowchart for describing a control method of a mobile terminal related to an embodiment of the present invention.
Figure 12A:
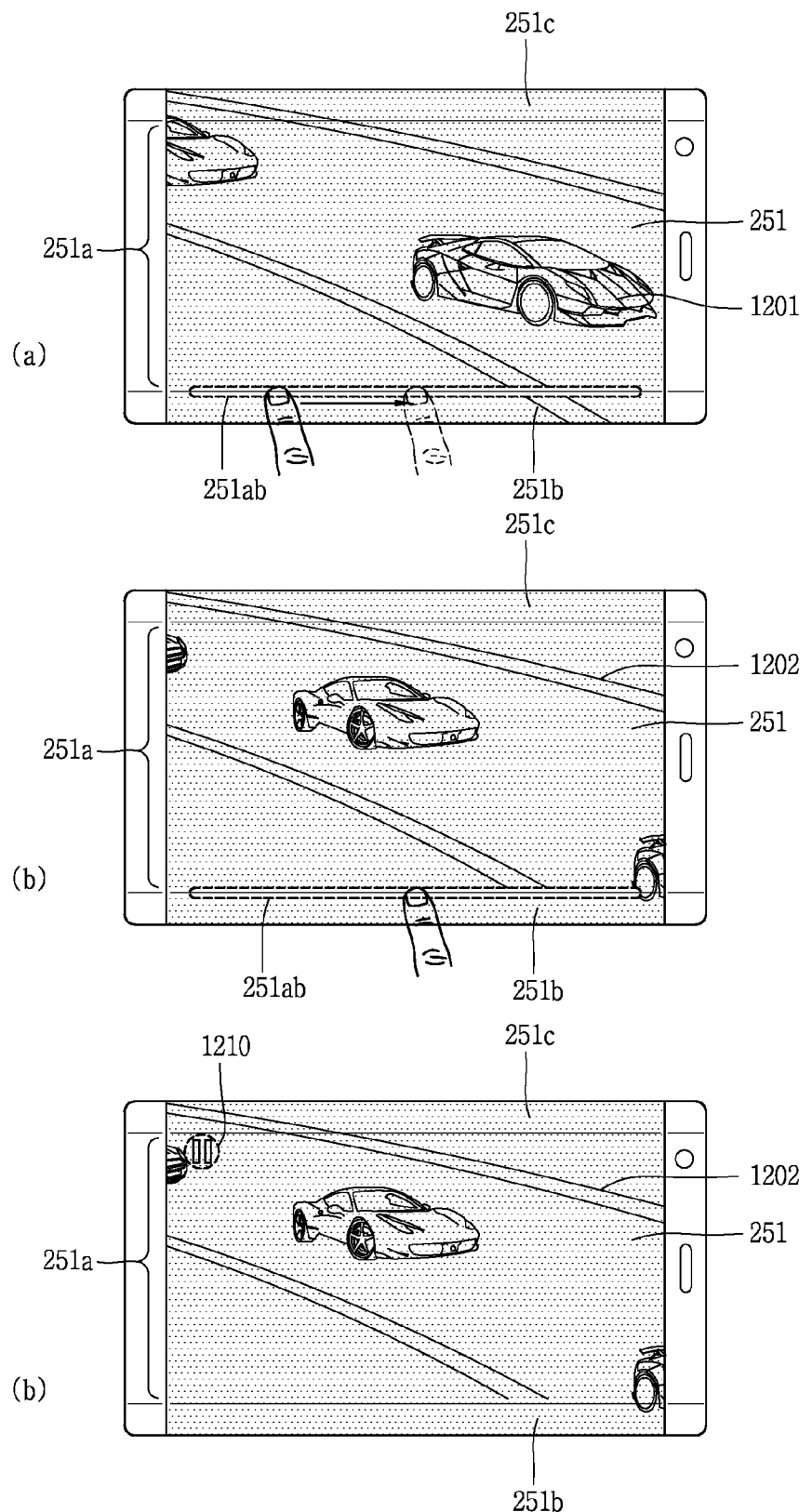
FIGS. 12A and 12B are conceptual diagrams for describing the flowchart of FIG. 11.
Figure 12B:
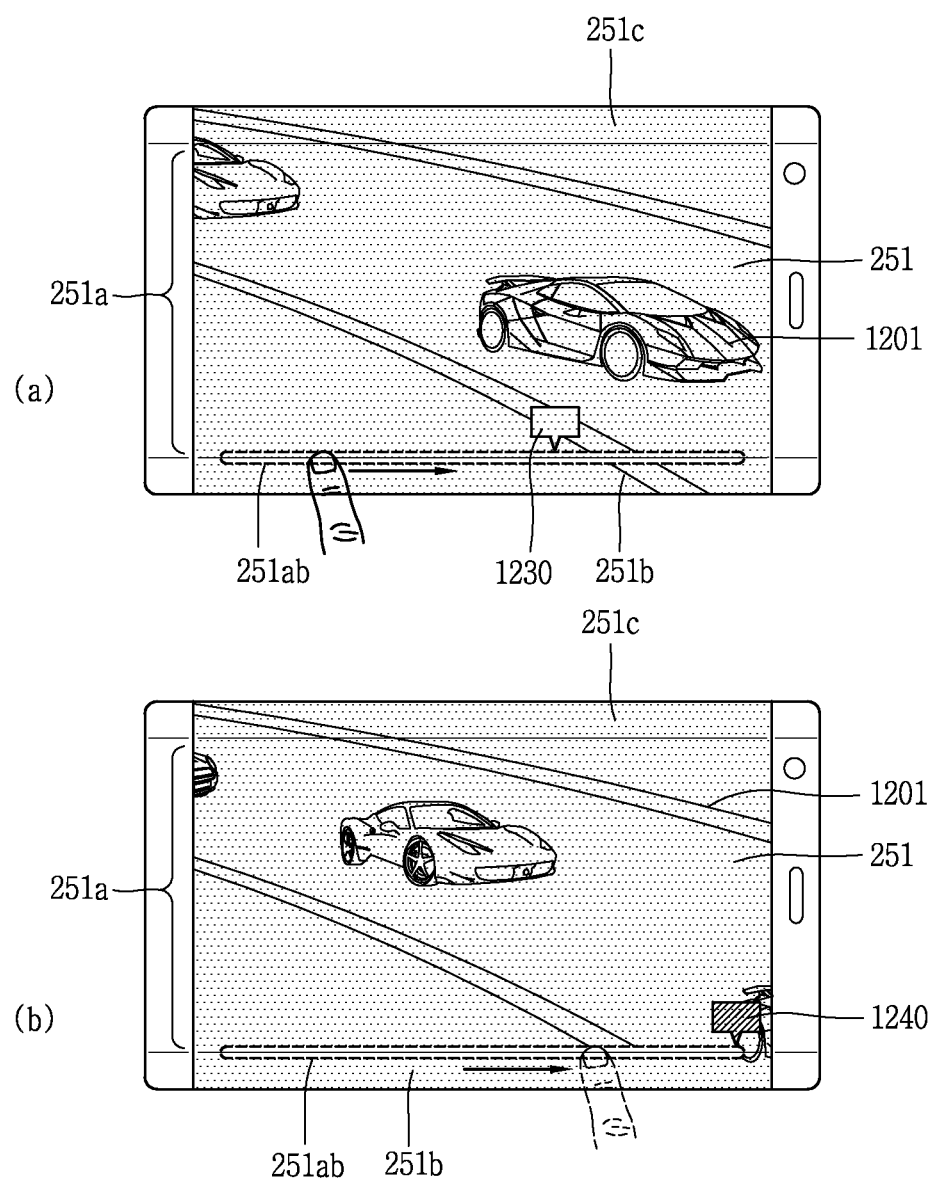

In this regard, FIG. 11 is an exemplary flowchart for describing a control method of a mobile terminal related to the embodiment, and FIGS. 12A and 12B are conceptual diagrams for describing the flowchart of FIG. 11.

Herein, description will be given under the assumption that the display unit 251 according to an embodiment of the present invention includes a front display area that is disposed on the front surface of a body and formed to have a first curvature and side display areas that extend from the front display area, are disposed on side surfaces of the body and are formed to have a second curvature as described above.

In FIG. 11, the mobile terminal according to the embodiment of the present invention may first output at least a part of the screen corresponding to execution of a specific application to the front display area of the display unit 251 (see FIG. 1B) (S1110).

In other words, the screen corresponding to the execution of the specific application may be output only to the front display area or output to extend to the side display area in addition to the front display area. In the former case, an icon for executing at least one function associated with the screen, alarm information (e.g., a received message or an incoming phone call) or separate information associated with a user-friendly function such as other status display bar may be output to the side display area.

Next, the mobile terminal may sense the dragging input applied to the interface region located between the front display area 251*a* and the side display area 251*b* of the display unit 251 (S1120).

Here, as described above, the interface region may be a position or area in which an outer edge of the front display area and an outer edge of the side display area meet. Further, the interface region may be a peak of a curvature surface when the side display area that meets the edge of the front display area is regarded to be one projected curvature surface. The interface region may be an area including a boundary area of the front display area and a boundary area of the side display area in a corner in which the front display area and the side display area meet.

In this way, when the drag input is sensed with respect to the interface region located between the front display area 251*a* and the side display area 251*b*, the control unit 180 may recognize this as an input of a control command associated with the control of the output screen. This is, the interface region may be set as an input area of the control command associated with the control of the output screen.

Specifically, the control unit 180 may set an area to which the drag input is applied as the input area of the control command associated with the screen control when the dragging input applied to the interface region extends or is maintained to exceed a predetermined range.

Here, the control command associated with the screen control may be changed depending on an attribute and a type of the screen that is currently being output to the display unit 251. For example, when the screen output to the display unit 251 is a moving image screen, the dragging input applied to the interface region may be recognized as the control command corresponding to movement (execution of rewinding or fast forwarding) to a specific scene. In addition, for example, when the screen output to the display unit 251 is a web screen including a home screen or a plurality of web pages, the dragging input applied to the interface region may be recognized as the control command corresponding to turning of a page.

In this way, when the dragging is input to the interface region located between the front and side display areas, the control unit 180 may differently change the execution screen depending on an extent in which the touch input applied to the interface region is dragged (S1130).

In this case, the control unit 180 may perform control such that a state in which at least a part of the execution screen is output to the interface region and the side display area is maintained while the touch input applied to the interface region is dragged in a state in which at least a part of the execution screen is output to extend to the interface region and the side display area in addition to the front display area. That is, since the graphic object for performing the drag input is not required to be output, a state in which the execution screen is also continuously to output to the side display area is maintained.

For example, when the user's dragging is input to an interface region 251*ab* located between the front and side display areas by a length equal to or greater than a predetermined range while a moving image screen 1201 is output to the front display area 251*a* and the side display areas 251*b* and 251*c* of the display unit 251 in (a) of FIG. 12A, a moving image screen 1202 moved by a length corresponding to the length of the drag input is output to the display unit 251 like (b) of FIG. 12A.

Meanwhile, when another touch input excluding the dragging input applied to the interface region is sensed, the control unit 180 may perform control to execute another function different from the function corresponding to the drag input.

For example, when a predetermined number (e.g., two) of short-touch inputs are applied to the interface region located between the front display area 251*a* and the side display area 251*b* while a moving image screen 1202 is output to the display unit 251 in (b) of FIG. 12A, the moving image screen is paused like (c) of FIG. 12A, a mark 1210 indicating the paused state may be displayed on the front display area 251*a*. Accordingly, the control command associated with the control of the output screen may be input variously using the interface region having a limited size.

Meanwhile, even when the interface region located between the front and side display areas is recognized as an input area of the control command associated with the control of the screen output to the display nit 251, the control unit 180 may perform control such that minimum displays corresponding to the drag input (the first input) and the release of the drag input are output.

Specifically, the control unit 180 may perform control such that a first mark corresponding to the touch input applied to the interface region and a second mark corresponding to the release of the touch input applied to the interface region are output to the front display area or the side display area.

For example, as illustrated in (a) of FIG. 12*b*, when the user applies a touch-down input for inputting dragging applied to the interface region located between the front and side display areas of the display unit 251, a mark 1230 corresponding to the touch input may be displayed on a position corresponding to the output position of the moving image screen that is currently being output to the display unit 251 in an edge area of the front display area 251*a*. In addition, as illustrated in (b) of FIG. 12B, when the user releases the dragging input applied to the interface region located between the front and side display areas of the display unit 251, a mark 1240 corresponding to the release of the touch input may be displayed on a position corresponding to the output position of the moving image screen that is currently being output to the display unit 251.

Furthermore, as shown in the drawing, here, the mark 1230 corresponding to the touch input and the mark 1240 corresponding to the release of the touch input may include a thumbnail having a specific scene or time information corresponding to the specific scene and merely include only information indicating the touch input or the release of the touch input.

As described above, by setting the interface region located between the front and side display areas to which the drag input can be applied stably as an input area associated with the screen control, a menu hiding at least a part of the screen output to the display unit is not required to be output from the beginning. Accordingly, it is possible to control a diverse and instinctive input while minimizing interruption in watching the screen due to the menu output.

As described above, according to the embodiments of the present invention, by outputting the menu associated with the screen control to the interface region located between the front and side display areas, the drag input for controlling the screen output to the display unit may be applied more stably. In addition, by setting the interface region located between the front and side display areas to which the drag input can be stably applied as an input area associated with the screen control, a menu hiding at least a part of the screen output to the display unit is not required to be output. Accordingly, it is possible to control a diverse and instinctive input while minimizing interruption in watching the screen due to the menu output.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The invention claimed is:

1. A mobile terminal, comprising:
a body including a front surface, side surfaces and a rear surface;
a touch screen including:
a first region disposed on the front surface and formed to have a first curvature;
second regions disposed on the side surfaces and extending from the first region, and each second region formed to have a second curvature; and
boundary regions, each boundary region located between an edge of the first region and an edge of one of the second regions and formed to have a peak;
a sensing unit configured to sense a touch input applied to the touch screen; and
a control unit configured to:
display on the first region of the touch screen at least a portion of an execution screen of an application;
detect a touch input applied to the execution screen;
display a bar associated with control of the execution screen on one of the boundary regions when the touch input is detected, wherein the bar is formed to enable a drag touch input to be input along the peak in a longitudinal direction of one of the boundary regions for stability dragging;
detect the drag touch input applied to the bar;
ignore the drag touch input applied to the first and second regions and output an alarm when the drag touch input applied to the bar is dragged to the first region or one of the second regions within a preset range;
move the bar and display the bar on another boundary region when the drag touch input applied to the bar is dragged to the first region or the second region beyond the preset range; and
change the execution screen to a screen corresponding to an extent of dragging of the drag touch input applied to the bar in response to the detected drag touch input.

2. The mobile terminal of claim 1, wherein the control unit changes the execution screen output to the touch screen in response to the drag touch input applied to the bar is moved from one position in the bar to another position.

3. The mobile terminal of claim 2, wherein the bar includes information indicating a position of the execution screen output to the touch screen, and
wherein the control unit is further configured to:
control an output range of the execution screen depending on the extent of the drag touch input applied to the bar.

4. The mobile terminal of claim 1, wherein the sensing unit is formed to further sense an inclination of the touch screen, and
wherein the control unit is further configured to:
display a first bar formed to enable dragging to be input in a horizontal direction to the boundary region in response to the fact that the touch screen is inclined to be a horizontal viewing mode; and
display a second bar formed to enable dragging to be input in a vertical direction to the boundary region in response to the fact that the touch screen is inclined to be a vertical viewing mode.

5. The mobile terminal of claim 1, wherein the first region having the first curvature is a plane area, the second regions having the second curvature are curved areas, and the peak of the boundary regions has the first curvature and the second curvature.

6. The mobile terminal of claim 1, wherein the sensing unit is configured such that the drag touch input applied to the bar is also able to be sensed with respect to an edge area of the first region adjacent to one of the boundary regions and an edge area of one of the second regions adjacent to the boundary regions.

7. The mobile terminal of claim 1, wherein, when the boundary regions are partitioned into a plurality of areas having different curvatures, the control unit performs control such that the bar is output to a position or area in which the first or second curvature is first changed.

8. The mobile terminal of claim 1, wherein, when the boundary regions are partitioned into a plurality of areas having different curvatures, the control unit performs control such that the bar is output to a boundary position or area having the greatest curvature or change extent in the curvature.

9. The mobile terminal of claim 1, wherein, when at least a part of the bar is output to one of the boundary regions while icons of a plurality of applications are output to one of the second regions, the control unit differently changes a method of a touch input for executing functions corresponding to the icons of the plurality of applications.

10. The mobile terminal of claim 1, wherein the control unit performs control such that visual information corresponding to moving of the drag touch input applied to the bar is output to one of the second regions.

11. The mobile terminal of claim 10, wherein the visual information is output to a position opposite to a moving direction of the drag touch input in one of the second regions, and
wherein, when a touch input is applied to the output visual information, the control unit performs control such that a screen corresponding to visual information to which the touch input is applied is output to the first region.

12. The mobile terminal of claim 1, wherein the touch screen is a flexible display that is bendable so that at least one of the first and second curvatures is changed by an external force, and
wherein the control unit performs control such that the bar is moved to a boundary position or area having the greatest change extent in the curvature due to the external force in response to bending of the flexible touch screen due to the external force.

13. The mobile terminal of claim 1, wherein, when the drag touch input applied to the bar leaves the bar by a criterion range or more and is moved to one position of the first region or one of the second regions, the control unit performs control such that the alarm is output.

14. The mobile terminal of claim 1, wherein the bar includes a first portion sensing the drag touch input and a second portion different from the first portion, and wherein the control unit outputs the first portion to one of the boundary regions and outputs the second portion to an edge area of the first region adjacent to one of the boundary regions or an edge area of one of the second regions adjacent to the boundary regions.

15. The mobile terminal of claim 1, wherein, when a touch input is sensed with respect to one area of the execution screen while at least a part of the execution screen is output to extend to the boundary regions and the second regions in addition to the first region, the control unit performs control such that a part of an execution screen that has been displayed to the boundary region and the second region is output only to the first region.

16. The mobile terminal of claim 1, wherein, when at least a part of the execution screen is output to extend to one of the boundary regions and one of the second regions in addition to the first region, the control unit changes a shape of the bar output to one of the boundary regions depending on an attribute in a background screen of the execution screen.

17. The mobile terminal of claim 4, wherein, when first and second objects associated with control of the execution screen are output at the same time, the control unit outputs at least a part of the first bar to one of the boundary regions and outputs the second bar to any one of the first region and the second regions.

* * * * *